(12) United States Patent
You et al.

(10) Patent No.: US 12,556,044 B2
(45) Date of Patent: Feb. 17, 2026

(54) POSITIONING SYSTEM AND METHOD BASED ON LOW FREQUENCY MAGNETIC FIELD, AND DEVICE

(71) Applicant: HUAWEI TECHNOLOGIES CO., LTD., Guangdong (CN)

(72) Inventors: Hongcheng You, Shenzhen (CN); Xiaosheng Zeng, Dongguan (CN); Yunhe Mao, Shenzhen (CN); Zhixian Wu, Dongguan (CN); Shuangquan Chen, Shenzhen (CN); Yanding Liu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/154,217

(22) Filed: Jan. 13, 2023

(65) Prior Publication Data

US 2023/0179030 A1 Jun. 8, 2023

Related U.S. Application Data

(63) Continuation of application No. PCT/CN2021/105725, filed on Jul. 12, 2021.

(30) Foreign Application Priority Data

Jul. 16, 2020 (CN) .......................... 202010687243.2

(51) Int. Cl.
*H02J 50/90* (2016.01)
*B60L 53/122* (2019.01)
(Continued)

(52) U.S. Cl.
CPC ............ *H02J 50/90* (2016.02); *B60L 53/122* (2019.02); *H02J 50/12* (2016.02); *H04B 5/263* (2024.01); *H04B 5/266* (2024.01)

(58) Field of Classification Search
None
See application file for complete search history.

(56) References Cited

U.S. PATENT DOCUMENTS

| 7,403,539 B1 | 7/2008 | Tang et al. |
| 10,023,059 B2 | 7/2018 | Roehrl et al. |
| (Continued) | | |

FOREIGN PATENT DOCUMENTS

| CN | 101216988 A | 7/2008 |
| CN | 101968906 A | 2/2011 |
| (Continued) | | |

OTHER PUBLICATIONS

Inagaki et al., "Design of LF-WPT systems of sympathetic connection employing non-resonant grounded antennas and external circuits which emulate the systems employing self-resonant electrically small antennas," In 2012 IEEE MTT-S International Microwave Workshop Series on Innovative Wireless Power Transmission: Technologies, Systems, and Applications, May 10, 2012, 4 pages.

(Continued)

*Primary Examiner* — Daniel Kessie
(74) *Attorney, Agent, or Firm* — Fish & Richardson P.C.

(57) ABSTRACT

Example positioning system based on a low frequency magnetic field and apparatus are described. One example positioning system includes a low frequency magnetic field transmit apparatus and a low frequency magnetic field receive apparatus. The transmit apparatus includes a transmit coil, a conflict detect coil, and a magnetic field generation detection control module. The receive apparatus includes a receive coil and a magnetic field detection control module. When the conflict detect coil does not sense a low frequency magnetic field signal, the magnetic field generation detection control module controls the transmit coil to transmit a first low frequency magnetic field signal. When the received low frequency magnetic field signal is the first (Continued)

low frequency magnetic field signal, the magnetic field detection control module determines relative positions of the transmit coil and the receive coil based on signal strength of the first low frequency magnetic field signal.

15 Claims, 11 Drawing Sheets

(51) Int. Cl.
*H02J 50/12* (2016.01)
*H04B 5/26* (2024.01)

(56) References Cited

U.S. PATENT DOCUMENTS

| | | |
|---|---|---|
| 10,144,302 B2 | 12/2018 | Samuelsson et al. |
| 10,403,113 B1 | 9/2019 | Antar et al. |
| 2003/0109253 A1 | 6/2003 | Fenton et al. |
| 2011/0127953 A1 | 6/2011 | Walley et al. |
| 2011/0260831 A1* | 10/2011 | Ieda .................. B60R 25/246 340/5.64 |
| 2015/0042168 A1 | 2/2015 | Widmer |
| 2016/0380488 A1 | 12/2016 | Widmer et al. |
| 2017/0005523 A1 | 1/2017 | Widmer et al. |
| 2017/0111088 A1 | 4/2017 | Seong et al. |
| 2018/0020461 A1 | 1/2018 | Tomeba et al. |
| 2018/0111492 A1* | 4/2018 | McCool ................. B60L 53/12 |
| 2018/0241258 A1 | 8/2018 | Seong |
| 2019/0054829 A1* | 2/2019 | Seong ................ A61N 1/37229 |
| 2020/0036214 A1 | 1/2020 | Partovi |
| 2020/0076474 A1 | 3/2020 | Daga et al. |
| 2021/0091605 A1* | 3/2021 | Nakao .................... H04B 5/266 |

FOREIGN PATENT DOCUMENTS

| | | |
|---|---|---|
| CN | 103730919 A | 4/2014 |
| CN | 105305578 A | 2/2016 |
| CN | 106353616 A | 1/2017 |
| CN | 107003402 A | 8/2017 |
| CN | 107054108 A | 8/2017 |
| CN | 107769399 A | 3/2018 |
| CN | 108462262 A | 8/2018 |
| CN | 109733216 A | 5/2019 |
| CN | 109890649 A | 6/2019 |
| CN | 110114957 A | 8/2019 |
| CN | 110293860 A | 10/2019 |
| CN | 110450660 A | 11/2019 |
| CN | 111114348 A | 5/2020 |
| CN | 111371522 A | 7/2020 |
| CN | 111600367 A | 8/2020 |
| DE | 102014013084 A1 | 3/2015 |
| EP | 2521277 A2 | 11/2012 |
| JP | H04140032 A | 5/1992 |

OTHER PUBLICATIONS

Yang et al., "Low-frequency tracking and positioning method for pipeline internal detector," Oil Gas Storage Transportation, Jun. 2018, 7 pages (with English abstract).
Du, "Paperback in wireless communications," Aug. 1, 2016, 5 pages (with English abstract).
International Search Report and Written Opinion in International Appln. No. PCT/CN2021/105725, mailed on Sep. 29, 2021, 15 pages (with English translation).
Extended European Search Report in European Appln. No. 21841759.0, mailed on Dec. 20, 2023, 19 pages.

* cited by examiner

1: Low frequency magnetic field transmit coil
2: Conflict detect coil

A, B, C: Low frequency magnetic field receive coil

POSITIONING SYSTEM AND METHOD BASED ON LOW FREQUENCY MAGNETIC FIELD, AND DEVICE

CROSS-REFERENCE TO RELATED APPLICATIONS

This application is a continuation of International Application No. PCT/CN2021/105725, filed on Jul. 12, 2021, which claims priority to Chinese Patent Application No. 202010687243.2, filed on Jul. 16, 2020. The disclosures of the aforementioned applications are hereby incorporated by reference in their entireties.

TECHNICAL FIELD

This application relates to the field of electromagnetic induction technologies, and in particular, to a positioning system and method based on a low frequency magnetic field, and a device.

BACKGROUND

With aggravation of energy shortage and environmental pollution problems in modern society, an electric vehicle, as a new energy vehicle, attracts wide attention once launched. The electric vehicle is a vehicle powered by an in-vehicle power supply, using a motor to drive vehicle wheels, and complying with various requirements of road traffic and safety regulations. Wireless charging through magnetic coupling is a manner of charging a battery of the electric vehicle. The wireless charging through magnetic coupling means transferring electric energy by using coupled electric fields or coupled magnetic fields as a medium. A wireless charging system generally includes two separate components: respectively a power transmit apparatus and a power receive apparatus. The power transmit apparatus is located in a wireless charging station. The power receive apparatus is located in an electric vehicle. The power transmit apparatus and the power receive apparatus transfer energy through electromagnetic induction between a power transmit coil and a power receive coil. When the power transmit coil and the power receive coil are misaligned or an alignment degree does not meet a requirement, a charging power or power efficiency of the wireless charging system decreases. Therefore, how to determine relative positions of the power transmit coil and the power receive coil to improve the alignment degree between the power transmit coil and the power receive coil is one of key technical problems that currently need to be urgently resolved in the wireless charging system.

In a research and practice process, the inventors of this application find that, in the conventional technologies, a low frequency magnetic field transmit coil is added to the power transmit apparatus end, and a control circuit corresponding to the low frequency magnetic field transmit coil drives the low frequency magnetic field transmit coil to generate an alternating low frequency magnetic field. A low frequency magnetic field receive coil is added to the power receive apparatus end, and the low frequency magnetic field receive coil generates an induced voltage or an induced current in the alternating magnetic field. Relative positions of the low frequency magnetic field transmit coil and the low frequency magnetic field receive coil are obtained based on signal strength of the induced voltage or the induced current. Relative positions of the power transmit coil and the power receive coil are obtained based on a position relationship between the low frequency magnetic field transmit coil and the power transmit coil and a position relationship between the low frequency magnetic field receive coil and the power receive coil. However, an effective range of the low frequency magnetic field is relatively large. Low frequency magnetic fields generated by low frequency magnetic field transmit coils of adjacent wireless charging stations interfere with each other. As a result, positioning accuracy of the low frequency magnetic field transmit coil and the low frequency magnetic field receive coil is low. Consequently, alignment accuracy of the power transmit coil and the power receive coil is low, and a charging power or power efficiency of the wireless charging system is low. Therefore, the wireless charging system has poor applicability.

SUMMARY

This application provides a positioning system and method based on a low frequency magnetic field, and a device, to improve positioning accuracy of a low frequency magnetic field transmit coil and a low frequency magnetic field receive coil, thereby implementing a simple operation and high applicability.

According to a first aspect, this application provides a positioning system based on a low frequency magnetic field. The positioning system includes a low frequency magnetic field transmit apparatus and a low frequency magnetic field receive apparatus. The low frequency magnetic field transmit apparatus includes a low frequency magnetic field transmit coil, a conflict detect coil, and a magnetic field generation detection control module. The low frequency magnetic field receive apparatus includes a low frequency magnetic field receive coil and a magnetic field detection control module. The conflict detect coil is configured to sense a low frequency magnetic field signal. The magnetic field generation detection control module is configured to: when the conflict detect coil does not sense the low frequency magnetic field signal, control the low frequency magnetic field transmit coil to transmit a first low frequency magnetic field signal. Herein, before the low frequency magnetic field transmit apparatus transmits the low frequency magnetic field signal by using the low frequency magnetic field transmit coil, the low frequency magnetic field transmit apparatus may use the conflict detect coil to determine whether the low frequency magnetic field signal can be sensed. In other words, the low frequency magnetic field transmit apparatus uses the conflict detect coil to detect whether a low frequency magnetic field channel is occupied. The low frequency magnetic field transmit coil transmits a low frequency magnetic field signal when the low frequency magnetic field channel is not occupied, to avoid mutual interference caused when low frequency magnetic field transmit coils of different positioning systems transmit low frequency magnetic field signals. The low frequency magnetic field receive coil is configured to receive a low frequency magnetic field signal. The magnetic field detection control module is configured to: when it is determined that the low frequency magnetic field signal received by the low frequency magnetic field receive coil is the first low frequency magnetic field signal, determine relative positions of the low frequency magnetic field transmit coil and the low frequency magnetic field receive coil based on signal strength of the first low frequency magnetic field signal. In this application, the low frequency magnetic field receive apparatus receives only the low frequency magnetic field signal transmitted by the low frequency magnetic field transmit coil of this positioning system. In other words, when the low frequency magnetic field signal received by the low frequency magnetic field receive coil is the low frequency magnetic field signal transmitted by the low frequency magnetic field transmit coil of this positioning system, the low frequency magnetic field receive apparatus determines the relative positions of the low frequency magnetic field transmit coil and the low frequency magnetic field receive coil based on the signal strength of the low frequency magnetic field signal, to avoid interference from a low frequency magnetic field signal transmitted by a low frequency magnetic field transmit coil of another positioning system, thereby improving positioning accuracy.

With reference to the first aspect, in a first possible implementation, the magnetic field generation detection control module is configured to: when a positioning function based on a low frequency magnetic field is enabled, generate an initial value of a countdown and start the countdown. The magnetic field generation detection control module is configured to: when the conflict detect coil does not sense the low frequency magnetic field signal and the countdown ends, control the low frequency magnetic field transmit coil to transmit the first low frequency magnetic field signal. In this application, the low frequency magnetic field transmit coil transmits the low frequency magnetic field signal when the conflict detect coil does not sense the low frequency magnetic field signal and the countdown ends, thereby reducing a probability that a conflict occurs when the low frequency magnetic field transmit coil and low frequency magnetic field transmit coil of another positioning system simultaneously transmit low frequency magnetic field signals.

With reference to the first aspect, in a second possible implementation, the magnetic field generation detection control module is further configured to: when the conflict detect coil senses a second low frequency magnetic field signal, stop the countdown and detect a signal length of the second low frequency magnetic field signal, and continue the countdown when the detection of the signal length of the second low frequency magnetic field signal is completed. In this application, if the conflict detect coil senses a background signal, the magnetic field generation detection control module may pause the countdown, detect a signal length of the background signal, and then continue the countdown, to ensure that transmitting the low frequency magnetic field signal by the low frequency magnetic field transmit coil when the countdown ends does not conflict with transmitting the low frequency magnetic field signal by the low frequency magnetic field transmit coil of the another positioning system.

With reference to the first possible implementation of the first aspect or the second possible implementation of the first aspect, in a third possible implementation, the initial value of the countdown is a random number. In this application, the initial value of the countdown is set to the random number, so that the following case can be avoided: low frequency magnetic field transmit coils of a plurality of positioning systems simultaneously transmit low frequency magnetic field signals when it is detected that the low frequency magnetic field channel is not occupied. A simple operation and high applicability are implemented.

With reference to the second possible implementation of the first aspect, in a fourth possible implementation, a first signal length of the first low frequency magnetic field signal is different from a second signal length of the second low frequency magnetic field signal. In this application, the signal length of the low frequency magnetic field signal transmitted by the low frequency magnetic field transmit coil may be an agreed-on signal length. If the signal length of the background signal (that is, the second low frequency magnetic field signal) detected by the conflict detect coil is the same as the agreed-on signal length, the agreed-on signal length of the low frequency magnetic field signal transmitted by the low frequency magnetic field transmit coil is adjusted, so that the signal length (that is, the first signal length) of the low frequency magnetic field signal (that is, the first low frequency magnetic field signal) transmitted by the low frequency magnetic field transmit coil is different from the signal length (that is, the second signal length) of the second low frequency magnetic field signal. In this way, it can be ensured that the low frequency magnetic field signal received by the low frequency magnetic field receive apparatus is the low frequency magnetic field signal transmitted by the low frequency magnetic field transmit coil of this positioning system, to ensure positioning accuracy of the low frequency magnetic field transmit coil and the low frequency magnetic field receive coil.

With reference to the fourth possible implementation of the first aspect, in a fifth possible implementation, the magnetic field generation detection control module is further configured to send the first signal length to the magnetic field detection control module. The magnetic field detection control module is configured to: when detecting that the signal length of the low frequency magnetic field signal received by the low frequency magnetic field receive coil is the same as the first signal length, determine that the low frequency magnetic field signal received by the low frequency magnetic field receive coil is the first low frequency magnetic field signal. In this application, the magnetic field detection control module determines, based on the signal length of the low frequency magnetic field signal received by the low frequency magnetic field receive coil, whether the low frequency magnetic field signal is the low frequency magnetic field signal transmitted by the low frequency magnetic field transmit coil of this positioning system, thereby implementing a simple operation.

With reference to any one of the first aspect to the fifth possible implementation of the first aspect, in a sixth possible implementation, the magnetic field generation detection control module includes a low frequency magnetic field detect circuit and a first capacitor. The conflict detect coil is connected in parallel to the first capacitor to obtain a parallel resonant circuit. The parallel resonant circuit is connected to the low frequency magnetic field detect circuit.

With reference to any one of the first aspect to the fifth possible implementation of the first aspect, in a seventh possible implementation, the low frequency magnetic field transmit coil and the conflict detect coil are the same coil. The magnetic field generation detection control module includes a low frequency magnetic field transmission control module, a low frequency magnetic field detect circuit, a direct current power supply, a first switch, a second switch, and a first capacitor. The coil is connected in parallel to the first capacitor to obtain a parallel resonant circuit. The parallel resonant circuit is connected to the low frequency magnetic field detect circuit. The first switch and the second switch are connected in series, and then are connected in parallel between two ends of the direct current power supply to obtain an inverter circuit. One end of the first capacitor is separately connected to a first switch and a second switch. The other end of the first capacitor is connected in series to the coil to obtain a series resonant circuit. The first capacitor and the inverter circuit form a low frequency magnetic field generate circuit of the coil. The low frequency magnetic field transmission control module is configured to control connection or disconnection of the first switch and the second switch to control the coil to sense the low frequency magnetic field signal or control the coil to transmit the first low frequency magnetic field signal. In this application, the low frequency magnetic field transmit coil and the conflict detect coil do not simultaneously work. Therefore, the conflict detect coil and the low frequency magnetic field transmit coil of the low frequency magnetic field transmit apparatus can be multiplexed, to simplify a system structure of the positioning system.

According to a second aspect, this application provides a positioning method based on a low frequency magnetic field. The method is applicable to a positioning system based on a low frequency magnetic field. The positioning system includes a low frequency magnetic field transmit apparatus and a low frequency magnetic field receive apparatus. The method includes: the low frequency magnetic field transmit apparatus senses a low frequency magnetic field signal by using a conflict detect coil. If the low frequency magnetic field signal is not sensed by using the conflict detect coil, the low frequency magnetic field transmit apparatus controls a low frequency magnetic field transmit coil to transmit a first low frequency magnetic field signal. The low frequency magnetic field receive apparatus receives a low frequency magnetic field signal by using a low frequency magnetic field receive coil. When it is determined that the low frequency magnetic field signal received by using the low frequency magnetic field receive coil is the first low frequency magnetic field signal, the low frequency magnetic field receive apparatus determines relative positions of the low frequency magnetic field transmit coil and the low frequency magnetic field receive coil based on signal strength of the first low frequency magnetic field signal.

With reference to the second aspect, in a first possible implementation, when a positioning function based on a low frequency magnetic field is enabled, the low frequency magnetic field transmit apparatus generates an initial value of a countdown and starts the countdown. If the low frequency magnetic field signal is not sensed by using the conflict detect coil and the countdown ends, the low frequency magnetic field transmit apparatus controls the low frequency magnetic field transmit coil to transmit the first low frequency magnetic field signal.

With reference to the first possible implementation of the second aspect, in a second possible implementation, if the low frequency magnetic field signal is sensed by using the conflict detect coil, the low frequency magnetic field transmit apparatus stops the countdown and detects a signal length of the sensed low frequency magnetic field signal, and continues the countdown when the detection of the signal length of the sensed low frequency magnetic field signal is completed.

With reference to the first possible implementation of the second aspect or the second possible implementation of the second aspect, in a third possible implementation, the initial value of the countdown is a random number.

With reference to any one of the second aspect to the second possible implementation of the second aspect, in a fourth possible implementation, a first signal length of the first low frequency magnetic field signal is different from a second signal length of the sensed low frequency magnetic field signal. The method further includes: the low frequency magnetic field transmit apparatus sends the first signal length to the low frequency magnetic field receive apparatus. The low frequency magnetic field receive apparatus receives the first signal length from the low frequency magnetic field transmit apparatus, and when the signal length of the low frequency magnetic field signal received by using the low frequency magnetic field receive coil is the same as the first signal length, determines that the low frequency magnetic field receive coil receives the first low frequency magnetic field signal.

According to a third aspect, this application provides a positioning method based on a low frequency magnetic field. The method is applicable to a low frequency magnetic field transmit apparatus in the positioning system provided in any one of the first aspect to the seventh possible implementation of the first aspect. In the method, the low frequency magnetic field transmit apparatus may sense a low frequency magnetic field signal by using a conflict detect coil. If the low frequency magnetic field signal is not sensed by using the conflict detect coil, the low frequency magnetic field transmit apparatus controls a low frequency magnetic field transmit coil to transmit a first low frequency magnetic field signal. Herein, the first low frequency magnetic field signal may be used to determine relative positions of the low frequency magnetic field transmit coil and low frequency magnetic field receive coil.

With reference to the third aspect, in a first possible implementation, when a positioning function based on a low frequency magnetic field is enabled, the low frequency magnetic field transmit apparatus may generate an initial value of a countdown and start the countdown. If the low frequency magnetic field signal is not sensed by using the conflict detect coil and the countdown ends, the low frequency magnetic field transmit apparatus controls the low frequency magnetic field transmit coil to transmit the first low frequency magnetic field signal.

With reference to the first possible implementation of the third aspect, in a second possible implementation, if the low frequency magnetic field signal is sensed by using the conflict detect coil, the low frequency magnetic field transmit apparatus stops the countdown and detects a signal length of the sensed low frequency magnetic field signal, and continues the countdown when the detection of the signal length of the sensed low frequency magnetic field signal is completed.

With reference to the first possible implementation of the third aspect or the second possible implementation of the third aspect, in a third possible implementation, the initial value of the countdown is a random number.

With reference to any one of the third aspect to the second possible implementation of the third aspect, in a fourth possible implementation, a first signal length of the first low frequency magnetic field signal is different from a second signal length of the sensed low frequency magnetic field signal. The low frequency magnetic field transmit apparatus may send the first signal length to a low frequency magnetic field receive apparatus.

According to a fourth aspect, this application provides a positioning method based on a low frequency magnetic field. The method is applicable to a low frequency magnetic field receive apparatus in the positioning system provided in any one of the first aspect to the seventh possible implementation of the first aspect. The method includes: the low frequency magnetic field receive apparatus receives a low frequency magnetic field signal by using a low frequency magnetic field receive coil. When it is determined that the low frequency magnetic field signal received by using the low frequency magnetic field receive coil is a first low frequency magnetic field signal transmitted by a low frequency magnetic field transmit apparatus in the positioning system, the low frequency magnetic field receive apparatus determines relative positions of a low frequency magnetic field transmit coil and the low frequency magnetic field receive coil based on signal strength of the first low frequency magnetic field signal.

With reference to the fourth aspect, in a first possible implementation, the method further includes: the low frequency magnetic field receive apparatus receives a first signal length from the low frequency magnetic field transmit apparatus, and when a signal length of the low frequency magnetic field signal received by using the low frequency magnetic field receive coil is the same as the first signal length, determines that the low frequency magnetic field signal received by using the low frequency magnetic field receive coil is the first low frequency magnetic field signal transmitted by the low frequency magnetic field transmit apparatus.

According to a fifth aspect, this application provides a wireless charging transmit-end device. The wireless charging transmit-end device includes a power transmit apparatus and a low frequency magnetic field transmit apparatus in the positioning system provided in any one of the first aspect to the seventh possible implementation of the first aspect.

According to a sixth aspect, this application provides a wireless charging receive-end device. The wireless charging receive-end device includes a power receive apparatus and a low frequency magnetic field receive apparatus in the positioning system provided in any one of the first aspect to the seventh possible implementation of the first aspect.

In this application, before the low frequency magnetic field transmit apparatus transmits the low frequency magnetic field signal by using the low frequency magnetic field transmit coil, the low frequency magnetic field transmit apparatus may use the conflict detect coil to detect whether the low frequency magnetic field channel is occupied. The low frequency magnetic field transmit coil transmits the low frequency magnetic field signal when the low frequency magnetic field channel is not occupied, to avoid mutual interference caused when low frequency magnetic field transmit coils of different positioning systems transmit low frequency magnetic field signals. When the low frequency magnetic field signal received by the low frequency magnetic field receive coil is the low frequency magnetic field signal transmitted by the low frequency magnetic field transmit coil of this positioning system, the low frequency magnetic field receive apparatus determines the relative positions of the low frequency magnetic field transmit coil and the low frequency magnetic field receive coil based on the signal strength of the low frequency magnetic field signal, to avoid interference from a low frequency magnetic field signal transmitted by a low frequency magnetic field transmit coil of another positioning system, to improve positioning accuracy of the low frequency magnetic field transmit coil and the low frequency magnetic field receive coil, thereby implementing a simple operation and high applicability.

DESCRIPTION OF EMBODIMENTS

The positioning system and method based on a low frequency magnetic field, and the device provided in this application are applicable to a wireless charging field of electric vehicles, and are also applicable to all other fields, other than the electric vehicles, that use a wireless charging technology, for example, the wireless charging field of smart robots and electric pallet trucks. This is not limited herein. In other words, the positioning system and method based on a low frequency magnetic field, and the apparatus provided in this application are applicable to a wireless charging system of an electric vehicle, and also applicable to a wireless charging system of a smart robot, an electric pallet truck, or the like. This may be specifically determined according to an actual application scenario. This is not limited herein. For ease of description, in this application, the wireless charging system applied to the electric vehicle is used as an example to describe the positioning system based on a low frequency magnetic field and the positioning method based on a low frequency magnetic field that are provided in this application.

A battery charging method of the electric vehicle generally includes contact charging and wireless charging. The contact charging means electricity conduction through metallic contact between a plug and a socket, and the wireless charging means transferring electric energy by using coupled electric fields or coupled magnetic fields as a medium. In comparison with the contact charging, the wireless charging is easy to perform, generates no spark, no electric shock risk, and no mechanical wear, can adapt to a plurality of severe environments and weather, can implement automatic charging and mobile charging, and so on, and therefore may become a main manner of charging the electric vehicle in the future. The wireless charging system applied to the electric vehicle is used as an example in the following to describe an instance of architecture of the wireless charging system to which the positioning system and method based on a low frequency magnetic field that are provided in this application are applied.

Figure 1:
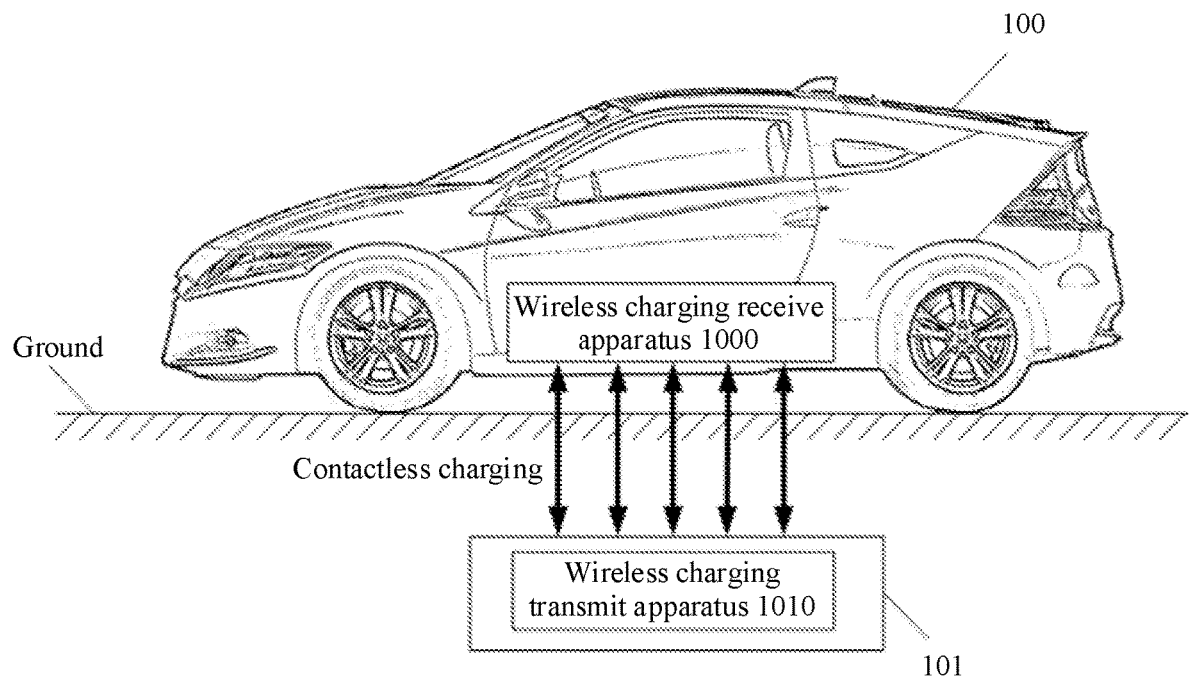
FIG. 1 is a schematic diagram of architecture of a wireless charging system according to this application.

The architecture of the wireless charging system:

FIG. 1 is a schematic diagram of architecture of a wireless charging system according to this application. As shown in FIG. 1, the wireless charging system may include at least an electric vehicle 100 and a wireless charging station 101. Herein, the electric vehicle 100 may be a wireless charging receive-end device, and the wireless charging station 101 may be a wireless charging transmit-end device. It may be understood that in the wireless charging system provided in this application, the wireless charging receive-end device includes but is not limited to the foregoing electric vehicle 100, and the wireless charging transmit-end device includes but is not limited to the foregoing wireless charging station 101. This may be specifically determined according to an actual application scenario. This is not limited herein. For ease of description, the following is described by using an example in which the electric vehicle 100 is the wireless charging receive-end device, and the wireless charging station 101 is the wireless charging transmit-end device. The electric vehicle 100 may include a wireless charging receive apparatus 1000, and the wireless charging station 101 may include a wireless charging transmit apparatus 1010. Currently, in a process of charging the electric vehicle by the wireless charging system, the wireless charging receive apparatus 1000 in the electric vehicle 100 cooperates with the wireless charging transmit apparatus 1010 in the wireless charging station 101 to perform non-contact charging. Herein, the wireless charging receive apparatus 1000 may also be referred to as a power receive apparatus, and the wireless charging transmit apparatus 1010 may also be referred to as a power transmit apparatus. This may be specifically determined according to an actual application scenario. This is not limited herein.

Optionally, in some feasible implementations, the wireless charging station 101 may be a fixed wireless charging station, a fixed wireless charging parking space, a wireless charging road, or the like. This may be specifically determined according to an actual application scenario. This is not limited herein. The foregoing wireless charging transmit apparatus 1010 may be disposed on the ground or may be buried under the ground (as shown in FIG. 1, the wireless charging transmit apparatus 1010 is buried under the ground). Wireless charging may be performed on the electric vehicle 100 located above the wireless charging transmit apparatus 1010. The wireless charging receive apparatus 1000 may be specifically integrated into the bottom of the electric vehicle 100. When the electric vehicle 100 enters a wireless charging range of the wireless charging transmit apparatus 1010, the electric vehicle 100 may be charged in a wireless charging manner. A power receive coil and a rectifier circuit of the wireless charging receive apparatus 1000 may be integrated together, or may be separated. When the power receive coil and the rectifier circuit are separated, the rectifier circuit is usually placed in the vehicle. As shown in FIG. 1, the power receive coil and the rectifier circuit are integrated together. The wireless charging transmit apparatus 1010 also has a manner in which a power transmit coil and an inverter circuit are integrated, and a manner in which the power transmit coil and the inverter circuit are separated. FIG. 1 shows a form in which the power transmit coil and the inverter circuit are integrated together.

Optionally, in some feasible implementations, the non-contact charging may be wireless energy transfer performed by the wireless charging receive apparatus 1000 and the wireless charging transmit apparatus 1010 through coupled magnetic fields, and may be specifically performed through electromagnetic induction or magnetic resonance. This may be specifically determined according to an actual application scenario. This is not specifically limited herein. Optionally, the electric vehicle 100 and the wireless charging station 101 may further perform bidirectional charging. In other words, the wireless charging station 101 may charge the electric vehicle 100 by using a power supply, or the electric vehicle 100 may discharge to the power supply. This may be specifically determined according to an actual application scenario. This is not limited herein.

Figure 2A:
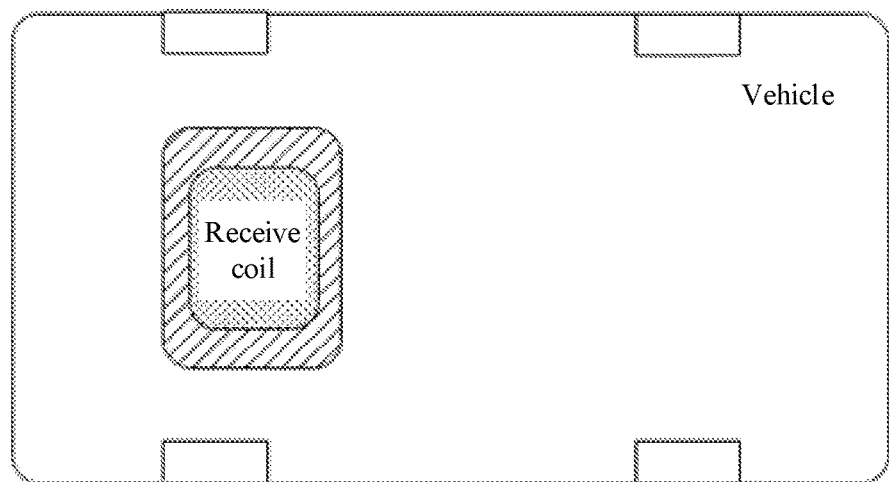
FIG. 2*a* is a schematic diagram of alignment between a power transmit coil and a power receive coil.
Figure 2B:
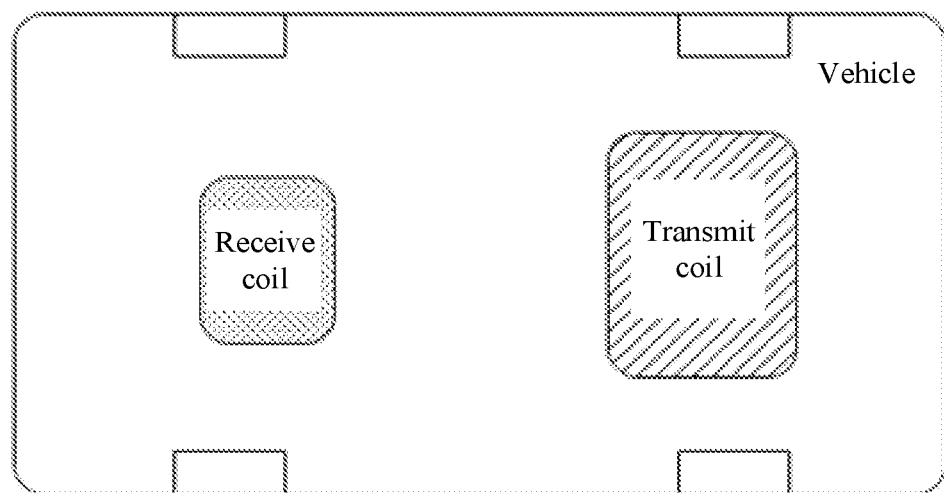
FIG. 2*b* is a schematic diagram of misalignment between a power transmit coil and a power receive coil.

In the wireless charging system shown in FIG. 1, the power transmit coil is located on the ground (on the ground or buried under the ground), and the power receive coil is located on the vehicle. Therefore, there is a problem of how to align the two coils. FIG. 2a is a schematic diagram of alignment between a power transmit coil and a power receive coil. As shown in FIG. 2a, when the power transmit coil (or briefly referred to as a transmit coil, that is, a round rectangle shown by using oblique lines) and the power receive coil (or briefly referred to as a receive coil, that is, a round rectangle shown by using dots) are aligned, the power transmit coil overlaps the power receive coil. In this case, charging power and charging efficiency of the wireless charging system are relatively high. FIG. 2b is a schematic diagram of nonalignment between the power transmit coil and the power receive coil. As shown in FIG. 2b, the power transmit coil and the power receive coil are misaligned in this case. When the power transmit coil and the power receive coil are misaligned or an alignment degree does not meet a requirement, the charging power or the charging efficiency of the wireless charging system decreases. To align the power transmit coil and the power receive coil, relative positions of the power transmit coil and the power receive coil may be obtained and then presented to a driver or an automatic driving system of the vehicle to guide the driver or the automatic driving system to align the power transmit coil and the power receive coil in a parking process.

Figure 3:
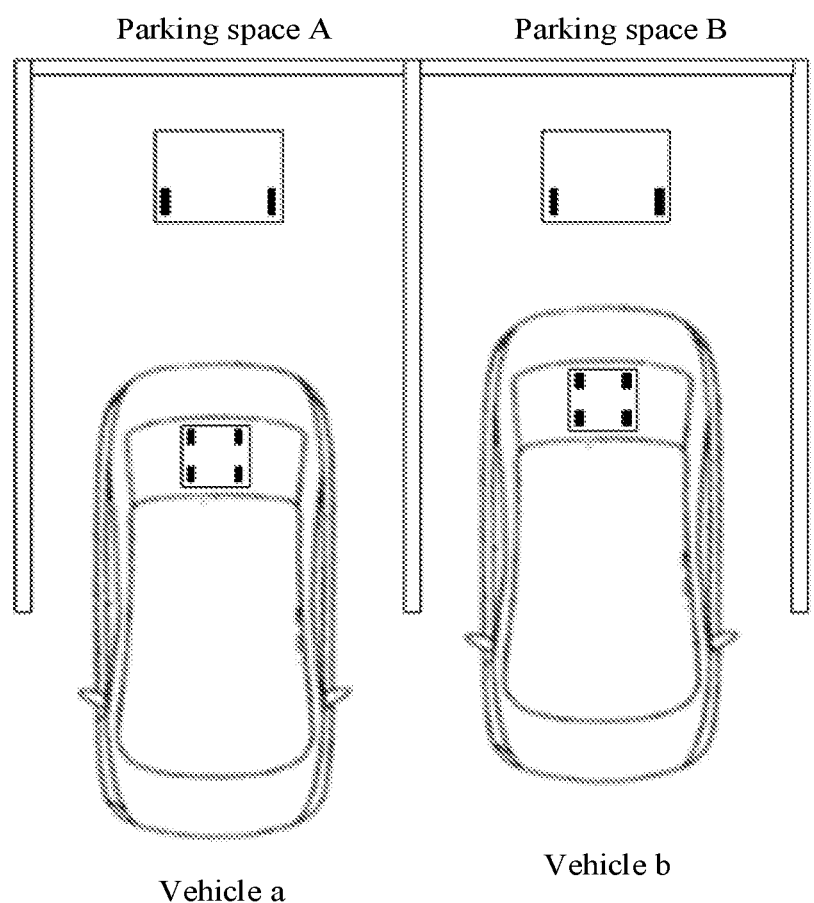
FIG. 3 is a schematic diagram of a positioning scenario based on a low frequency magnetic field according to this application.

FIG. 3 is a schematic diagram of a positioning scenario based on a low frequency magnetic field according to this application. When two adjacent wireless charging stations (for example, two adjacent parking spaces: a parking space A and a parking space B shown in FIG. 3) simultaneously have vehicles performing guiding alignment between the power transmit coil and the power receive coil (for ease of description, the guiding alignment between the power transmit coil and the power receive coil may be briefly referred to as guiding alignment), a low frequency magnetic field receive coil of a vehicle a to be parked at the parking space A (that is, the low frequency magnetic field receive coil disposed on the vehicle a) may detect a low frequency magnetic field signal transmitted by a low frequency magnetic field transmit coil at the parking space B (that is, the low frequency magnetic field transmit coil buried under the parking space B), and a low frequency magnetic field receive coil of a vehicle b may also detect a low frequency magnetic field signal transmitted by a low frequency magnetic field transmit coil at the parking space A. If a low frequency magnetic field receive apparatus on the vehicle a determines, based on the low frequency magnetic field signal transmitted by the low frequency magnetic field transmit coil at the parking space B, relative positions of a wireless charging transmit apparatus (assuming that the wireless charging transmit apparatus is a wireless charging transmit apparatus 1) on the vehicle a and a wireless charging receive apparatus (assuming that the wireless charging receive apparatus is a wireless charging receive apparatus 1) at the parking space A, alignment between the wireless charging transmit apparatus 1 and the wireless charging receive apparatus 1 (which may be specifically alignment between the power transmit coil and the power receive coil) may be inaccurate, thereby causing low charging efficiency of the vehicle a.

The positioning system based on a low frequency magnetic field provided in this application includes a low frequency magnetic field transmit apparatus and a low frequency magnetic field receive apparatus. The low frequency magnetic field transmit apparatus may be disposed at the wireless charging transmit apparatus 1010 end of the wireless charging system shown in FIG. 1, and the low frequency magnetic field receive apparatus may be disposed at the wireless charging receive apparatus 1000 end of the wireless charging system shown in FIG. 1. Alternatively, the low frequency magnetic field transmit apparatus may be disposed at the wireless charging receive apparatus 1000 end of the wireless charging system shown in FIG. 1, and the low frequency magnetic field receive apparatus may be disposed at the wireless charging transmit apparatus 1010 end of the wireless charging system shown in FIG. 1. This may be specifically determined according to an actual application scenario. This is not limited herein. For ease of description, the following is described by using an example in which the low frequency magnetic field transmit apparatus is disposed at the wireless charging transmit apparatus 1010 end, and the low frequency magnetic field receive apparatus is disposed at the wireless charging receive apparatus 1000 end.

Figure 4:
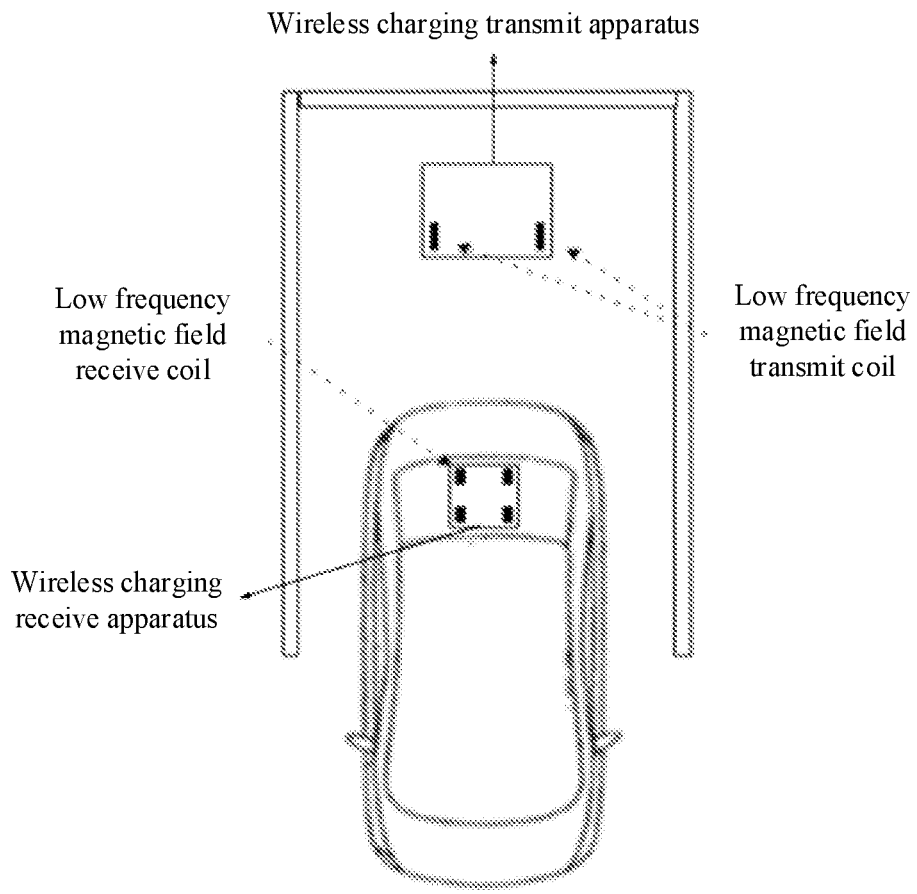
FIG. 4 is a schematic diagram of settings of a positioning system based on a low frequency magnetic field according to this application.

FIG. 4 is a schematic diagram of settings of a positioning system based on a low frequency magnetic field according to this application. As shown in FIG. 4, a low frequency magnetic field transmit apparatus is disposed at a wireless charging transmit apparatus end (or referred to as a wireless charging transmit end). The low frequency magnetic field transmit apparatus includes a low frequency magnetic field transmit coil and a magnetic field generation detection control circuit. The magnetic field generation detection control circuit may drive the low frequency magnetic field transmit coil to generate an alternating low frequency (low frequency, LF) magnetic field (a frequency of the low frequency magnetic field is about 100 kHz). A low frequency magnetic field receive apparatus is disposed at a wireless charging receive apparatus end (or referred to as a wireless charging receive end). The low frequency magnetic field receive apparatus includes a low frequency magnetic field receive coil and a magnetic field detection control circuit. The low frequency magnetic field receive coil receives an induced voltage or an inducted current generated in the alternating magnetic field. The magnetic field detection control circuit obtains relative positions of the low frequency magnetic field transmit coil and the low frequency magnetic field receive coil based on signal strength of the inducted voltage or the inducted current received by the low frequency magnetic field receive coil. Relative positions of a power transmit coil and a power receive coil are obtained based on relative positions of the low frequency magnetic field transmit coil and the power transmit coil and relative positions of the low frequency magnetic field receive coil and the power receive coil. In addition, a conflict detect apparatus may be added to the low frequency magnetic field transmit apparatus in the positioning system based on a low frequency magnetic field provided in this application. In other words, the low frequency magnetic field transmit end includes at least one low frequency magnetic field transmit apparatus and one conflict detect apparatus. The conflict detect apparatus includes a conflict detect coil and a magnetic field conflict detect circuit. The magnetic field conflict detect circuit may be integrated into the magnetic field generation detection control circuit of the low frequency magnetic field transmit apparatus. The magnetic field generation detection control circuit of the low frequency magnetic field transmit apparatus may be integrated with a control module of the wireless charging transmit apparatus shown in FIG. 1, or may be a function module independent of a control module of the wireless charging transmit apparatus. This may be specifically determined according to an actual application scenario. This is not limited herein. Before the low frequency magnetic field transmit coil transmits a low frequency magnetic field signal, a low frequency magnetic field signal is sensed by using the conflict detect coil, and whether the low frequency magnetic field transmit coil is controlled to transmit the low frequency magnetic field signal is determined through determining, based on a status in which the conflict detect coil senses the low frequency magnetic field signal, whether a low frequency magnetic field channel is occupied, to implement guiding alignment, thereby resolving a problem of mutual interference between magnetic field signals of adjacent parking spaces when guiding alignment is simultaneously performed at the adjacent parking spaces.

Figure 5:
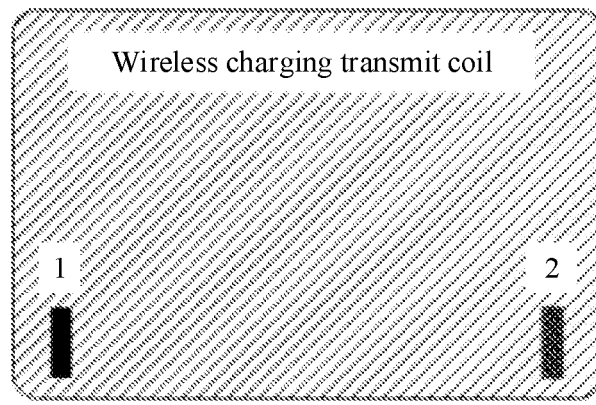
FIG. 5 is a schematic diagram of settings of a low frequency magnetic field transmit coil and a conflict detect coil according to this application.

FIG. 5 is a schematic diagram of settings of a low frequency magnetic field transmit coil and a conflict detect coil according to this application. As shown in FIG. 5, at least one low frequency magnetic field transmit coil and a conflict detect coil may be disposed on the wireless charging transmit coil. The low frequency magnetic field transmit coil and the conflict detect coil may be disposed on a side of a transmit coil of the wireless charging transmit apparatus 1010 toward a receive coil of the wireless charging receive apparatus 1000. It may be understood that positions of the low frequency magnetic field transmit coil and the conflict detect coil in FIG. 5 are merely examples. In a specific application scenario, the positions of the low frequency magnetic field transmit coil and the conflict detect coil may be set according to an actual application scenario requirement. This is not limited herein. In FIG. 5, the low frequency magnetic field transmit coil may be a coil wound around a magnetic rod, or the conflict detect coil may be a coil wound around a magnetic rod.

Figure 6:
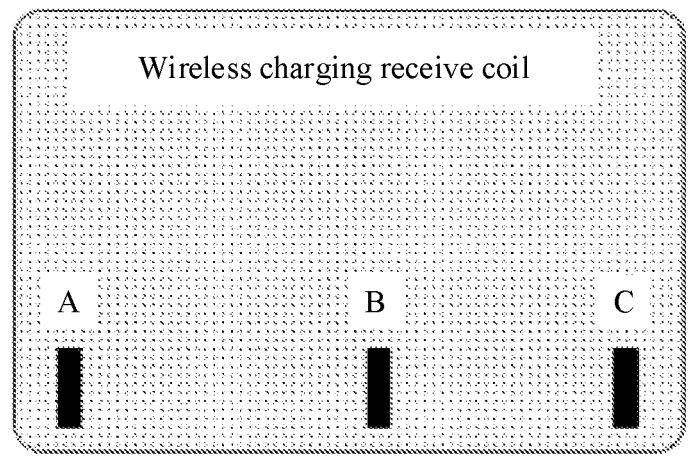
FIG. 6 is a schematic diagram of settings of a low frequency magnetic field receive coil according to this application.

FIG. 6 is a schematic diagram of settings of a low frequency magnetic field receive coil according to this application. As shown in FIG. 6, at least three low frequency magnetic field receive coils may be disposed on the wireless charging receive coil. The low frequency magnetic field receive coil may be disposed on a side of a receive coil of the wireless charging receive apparatus 1000 toward a transmit coil of the wireless charging transmit apparatus 1010. It may be understood that positions of the low frequency magnetic field receive coils in FIG. 6 are merely examples. In a specific application scenario, the positions of the low frequency magnetic field receive coils may be set according to an actual application scenario requirement. This is not limited herein. In FIG. 6, the low frequency magnetic field receive coil may be a coil wound around a magnetic rod.

Figure 7:
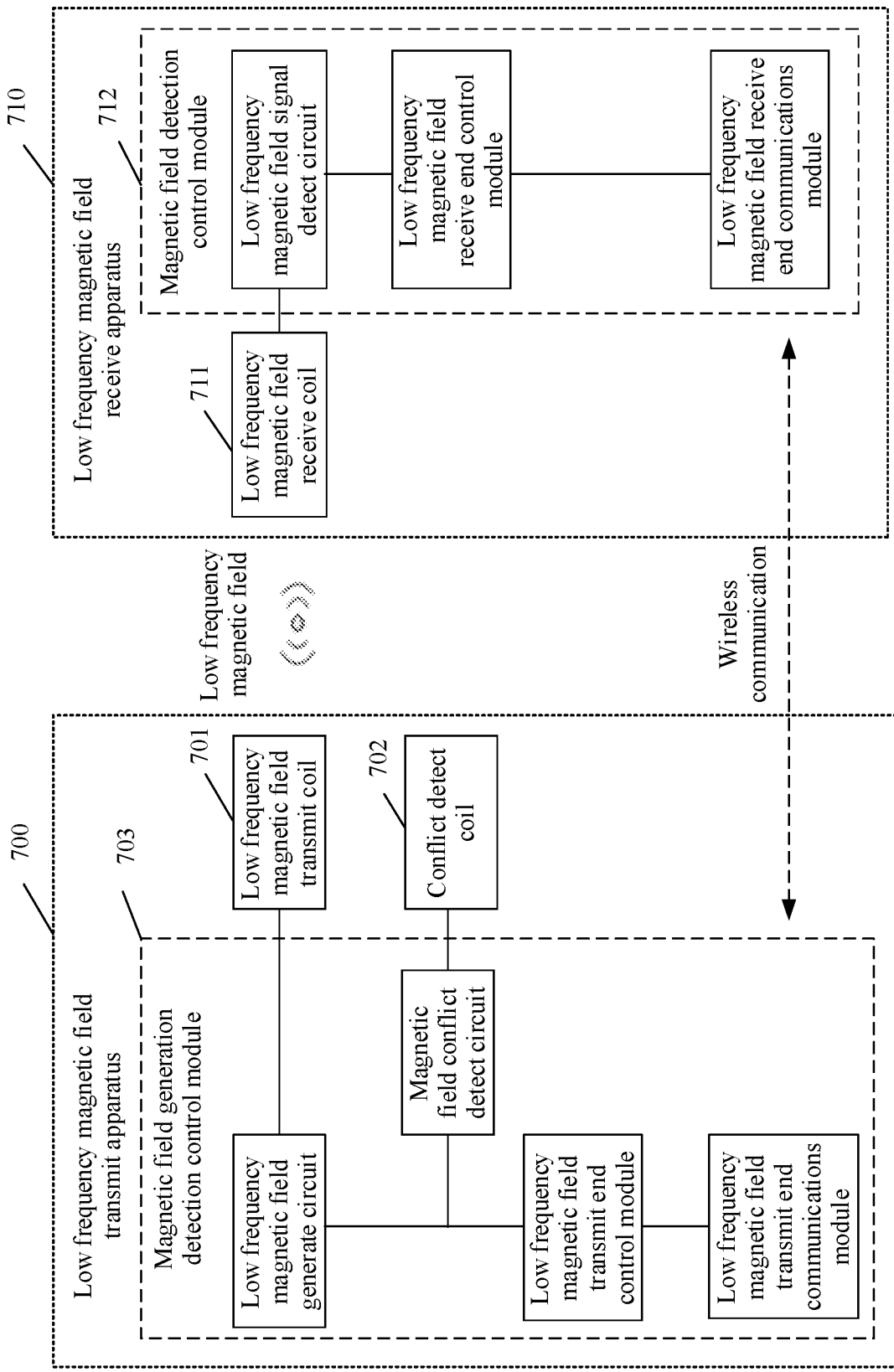
FIG. 7 is a schematic diagram of a structure of a positioning system based on a low frequency magnetic field according to this application.

Structure of a positioning system based on a low frequency magnetic field:

FIG. 7 is a schematic diagram of a structure of a positioning system based on a low frequency magnetic field according to this application. The positioning system based on a low frequency magnetic field provided in this application may include a low frequency magnetic field transmit apparatus 700 and a low frequency magnetic field receive apparatus 710. The low frequency magnetic field transmit apparatus 700 includes a low frequency magnetic field transmit coil 701, a conflict detect coil 702, and a magnetic field generation detection control module 703. The low frequency magnetic field receive apparatus 710 includes a low frequency magnetic field receive coil 711 and a magnetic field detection control module 712. The magnetic field generation detection control module 703 may be integrated with a control module of a wireless charging transmit apparatus, or may be an independent function module. This may be specifically determined according to an actual application scenario. This is not limited herein. The magnetic field detection control module 712 may be integrated with a control module of a wireless charging receive apparatus, or may be an independent function module. This may be specifically determined according to an actual application scenario. This is not limited herein.

Optionally, in some feasible implementations, as shown in FIG. 7, the magnetic field generation detection control module (which may be specifically a magnetic field generation detection control circuit) 703 may include a low frequency magnetic field generate circuit, a low frequency magnetic field transmit-end control module, a low frequency magnetic field transmit-end communications module, and a magnetic field conflict detect circuit. The magnetic field detection control module 712 may include a low frequency magnetic field signal detect circuit, a low frequency magnetic field receive-end control module, a low frequency magnetic field receive-end communications module, and the like. Descriptions of specific functions of the parts are as follows:

The low frequency magnetic field transmit coil is configured to: when the conflict detect coil detects that a low frequency magnetic field channel is not occupied, transmit an alternating low frequency magnetic field (for ease of description, an example in which a low frequency magnetic field signal generated in this case may be a first low frequency magnetic field signal is used for description), have magnetic induction with the low frequency magnetic field receive coil of the low frequency magnetic field receive apparatus, and transfer energy through magnetic coupling, to transmit the low frequency magnetic field signal to the low frequency magnetic field receive coil.

The low frequency magnetic field generate circuit includes an inverter circuit and a capacitor. A high frequency alternating voltage is generated by using the inverter circuit, and then is provided for the capacitor and the low frequency magnetic field transmit coil. The capacitor and the low frequency magnetic field transmit coil form a series resonant network, to generate high frequency series resonance.

The conflict detect coil is configured to sense a low frequency magnetic field signal, to determine whether a low frequency magnetic field signal of an adjacent parking space is sensed.

The magnetic field conflict detect circuit is configured to detect, based on the low frequency magnetic field signal sensed by the conflict detect coil, whether the adjacent parking space is transmitting a low frequency magnetic field signal. The magnetic field conflict detect circuit does not need external power supply (excitation). If another low frequency magnetic field signal is automatically sensed, the sensed low frequency magnetic field signal is correspondingly processed and then transmitted to the low frequency magnetic field transmit-end control module.

The low frequency magnetic field transmit-end control module is configured to: control the low frequency magnetic field generate circuit and the magnetic field conflict detect circuit, control connection and disconnection of a controllable switch transistor in the inverter circuit in the low frequency magnetic field generate circuit, and control a signal detected by the magnetic field conflict detect circuit.

The low frequency magnetic field transmit-end communications module is configured to send and receive information exchanged between the low frequency magnetic field transmit apparatus and the low frequency magnetic field receive apparatus in conflict detection. The information includes a signal length of the low frequency magnetic field signal transmitted by the low frequency magnetic field transmit coil, and the like.

The low frequency magnetic field receive coil is configured to receive, through electromagnetic induction, a low frequency magnetic field signal transmitted by the low frequency magnetic field transmit coil.

The low frequency magnetic field signal detect circuit is configured to: detect a low frequency magnetic field signal received by the low frequency magnetic field receive coil, and provide the low frequency magnetic field signal for the low frequency magnetic field receive-end control module for processing.

The low frequency magnetic field receive-end control module is configured to: process the low frequency magnetic field signal detected by the low frequency magnetic field signal detect circuit, and generate a related control instruction.

The low frequency magnetic field receive-end communications module is configured to send and receive information exchanged between the low frequency magnetic field transmit apparatus and the low frequency magnetic field receive apparatus in conflict detection. The information includes a signal length of the low frequency magnetic field signal transmitted by the low frequency magnetic field transmit apparatus, and the like. In this application, information sent or received by the low frequency magnetic field receive-end communications module in the low frequency magnetic field receive apparatus or the low frequency magnetic field transmit-end communications module in the low frequency magnetic field transmit apparatus is explained by using a communication protocol jointly followed by both parties. Details are not described below.

For ease of description, the foregoing operations performed by the low frequency magnetic field generate circuit, the low frequency magnetic field transmit-end control module, the low frequency magnetic field transmit-end communications module, and the magnetic field conflict detect circuit are described by using the magnetic field generation detection control module 703 as an execution body in an example. The foregoing operations performed by the low frequency magnetic field signal detect circuit, the low frequency magnetic field receive-end control module, and the low frequency magnetic field receive-end communications module are described by using the magnetic field detection control module 712 as an execution body in an example.

Figure 8:
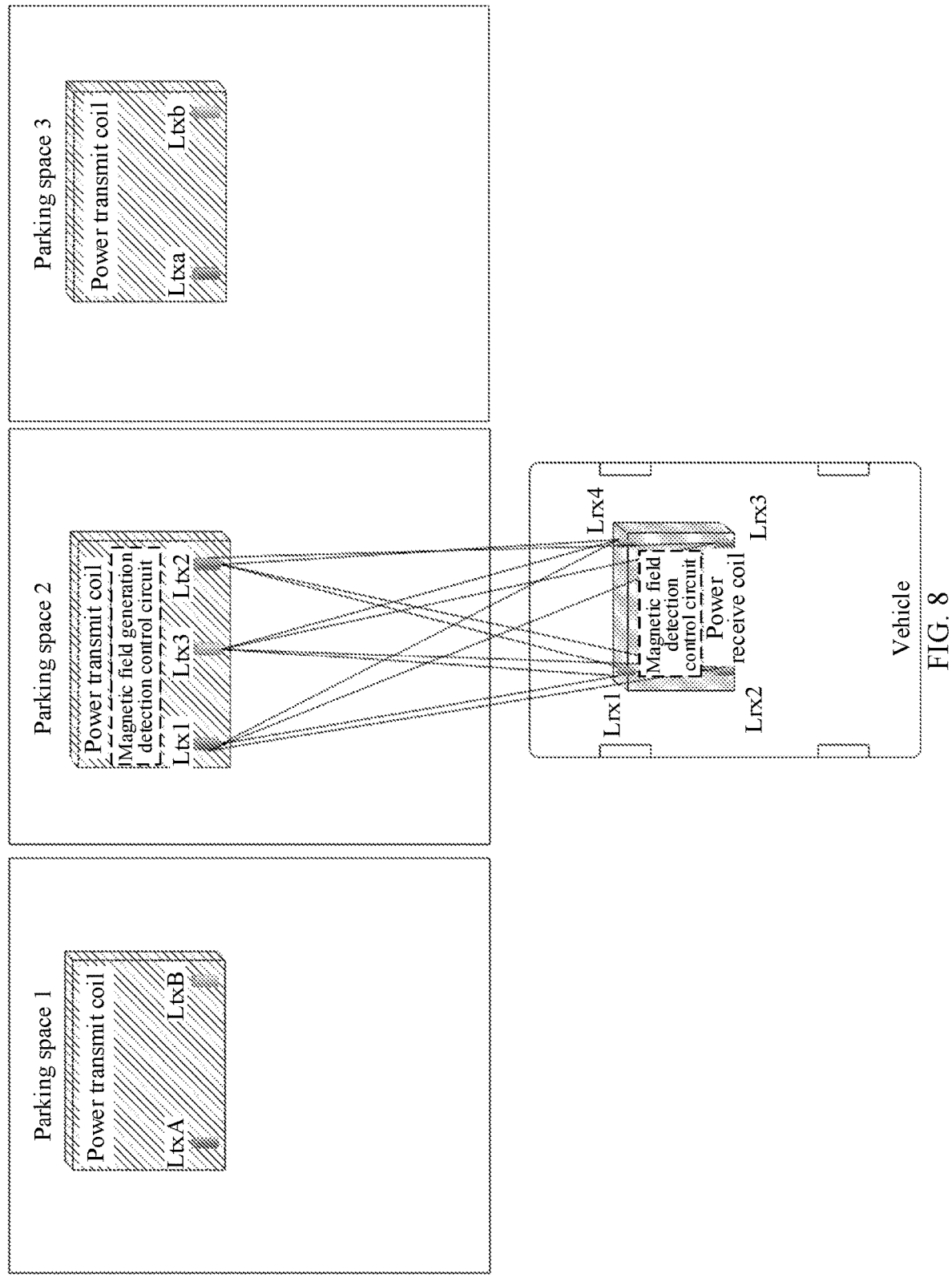
FIG. 8 is a schematic diagram of an application scenario of a positioning system based on a low frequency magnetic field according to this application.

Schematic diagram of an application scenario:

FIG. 8 is a schematic diagram of an application scenario of a positioning system based on a low frequency magnetic field according to this application. The positioning system provided in this application may be applied in guiding alignment in a wireless charging parking process of an electric vehicle. In this application scenario, it is assumed that there are a parking space 1, a parking space 2, and a parking space 3, a power transmit coil of a wireless charging transmit apparatus is disposed at each parking space, and a vehicle on which a wireless charging receive apparatus is installed needs to be charged at the parking space. When the vehicle is at a specified distance (for example, two meters to five meters) from a power transmit coil of a wireless charging apparatus, a guiding alignment function is enabled. By using the positioning system based on a low frequency magnetic field provided in this application, a position relationship of a power receive coil disposed on the vehicle relative to the power transmit coil disposed at the parking space may be detected, and further a driver or an automatic parking system is assisted in guiding alignment based on the position relationship. A low frequency magnetic field transmit apparatus for guiding alignment is disposed on a power transmit coil at each of the plurality of parking spaces. A low frequency magnetic field receive apparatus is disposed on the vehicle. In a guiding alignment process for parking the vehicle, a target is parking the vehicle at the parking space 2. However, in a guiding alignment process, the low frequency magnetic field receive apparatus on the vehicle may detect a low frequency magnetic field signal from the parking space 1 or the parking space 3 (that is, a low frequency magnetic field signal transmitted by the low frequency magnetic field transmit apparatus at the parking space 1 or the parking space 3). The positioning system provided in this application may perform guiding alignment based on conflict detection. As shown in FIG. 8, the low frequency magnetic field transmit apparatus for guiding alignment may be installed on the power transmit coil of the wireless charging transmit apparatus. At least one (assuming two) low frequency magnetic field transmit coil for guiding alignment (for example, LtxA and LtxB disposed on the power transmit coil at the parking space 1, Ltx1 and Ltx2 disposed on the power transmit coil at the parking space 2, and Ltxa and Ltxb disposed on the power transmit coil at the parking space) and one conflict detect coil for conflict detection (for example, Ltx3) are disposed on the power transmit coil. A magnetic field generation detection control circuit including a low frequency magnetic field generate circuit, a magnetic field conflict detect circuit, a low frequency magnetic field transmit-end control module, and a low frequency magnetic field transmit-end communications module is also installed on the power transmit coil. The low frequency magnetic field receive apparatus for guiding alignment is installed on the power receive coil. At least three (assuming four) low frequency magnetic field receive coils (for example, Lrx1, Lrx2, Lrx3, and Lrx4) are installed on the wireless charging receive coil. A magnetic field detection control circuit including a low frequency magnetic field detect circuit, a low frequency magnetic field receive-end control module, and a low frequency magnetic field receive-end communications module is also installed on the power receive coil.

For ease of description, the positioning system based on a low frequency magnetic field provided in this application is described by using an example in which the positioning system based on a low frequency magnetic field is set in the wireless charging system at the parking space 2. The positioning system based on a low frequency magnetic field includes the low frequency magnetic field transmit apparatus disposed on the wireless charging transmit apparatus at the parking space 2 and the low frequency magnetic field receive apparatus disposed on the wireless charging receive apparatus at the parking space 2. Details are not described below.

Figure 9:
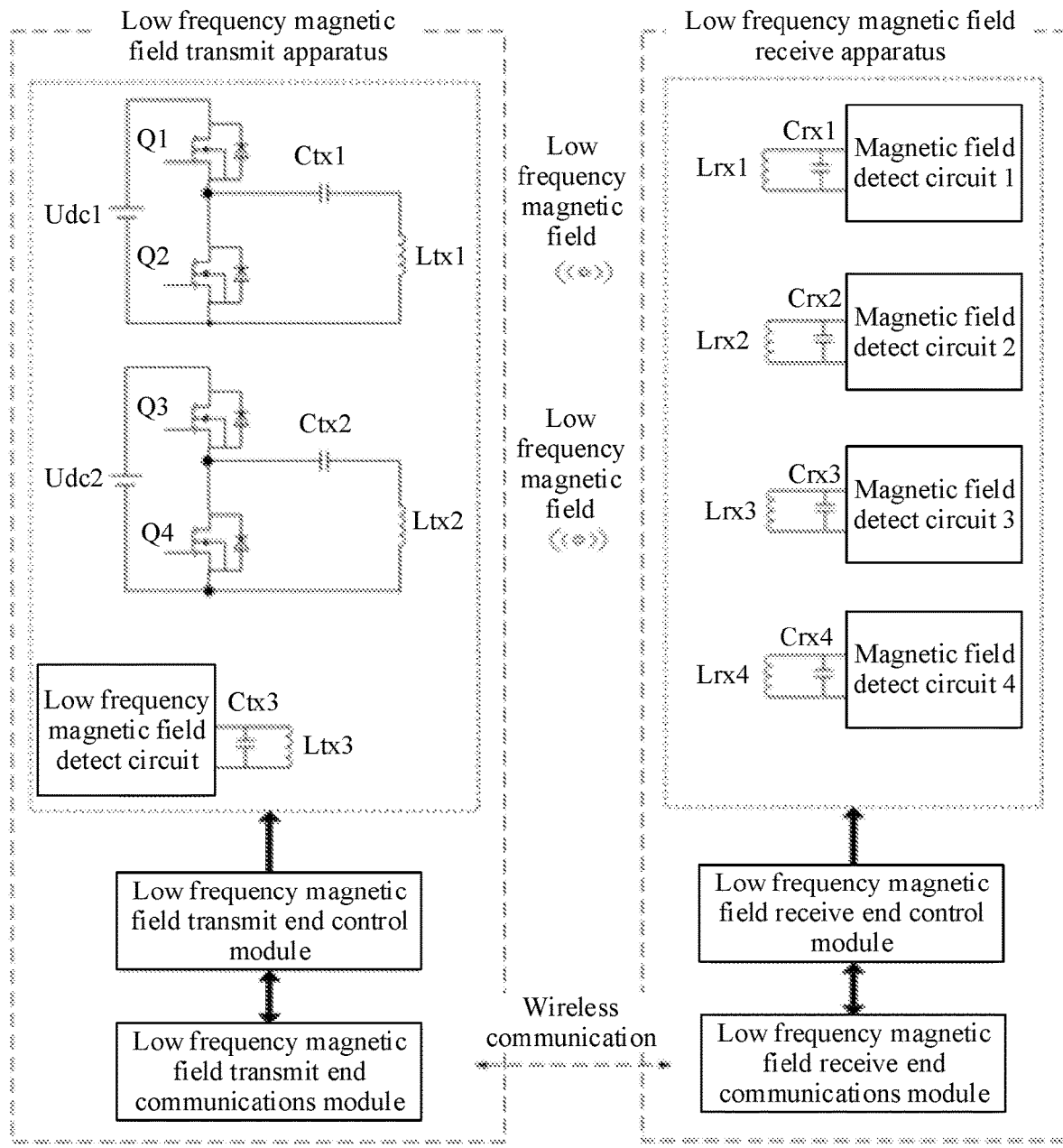
FIG. 9 is a schematic diagram of a hardware structure of a positioning system based on a low frequency magnetic field according to this application.

Hardware structure 1 of a positioning system based on a low frequency magnetic field:

FIG. 9 is a schematic diagram of a hardware structure of a positioning system based on a low frequency magnetic field according to this application. A magnetic field generation detection control module in a low frequency magnetic field transmit apparatus provided in this application may include a low frequency magnetic field detect circuit and a first capacitor (for example, Ctx3). A conflict detect coil (for example, Ltx3) is connected in parallel to Ctx3 to obtain a parallel resonant circuit. The parallel resonant circuit is connected to the low frequency magnetic field detect circuit. It may be understood that Ctx3 herein and the low frequency magnetic field detect circuit may form a magnetic field conflict detect circuit, a magnetic field conflict detect apparatus and the conflict detect coil form the magnetic field conflict detect apparatus, and the magnetic field conflict detect apparatus is connected to a low frequency magnetic field transmit-end control module. The low frequency magnetic field transmit apparatus provided in this application includes at least one low frequency magnetic field transmit coil. As shown in FIG. 9, it is assumed that the low frequency magnetic field transmit apparatus includes two low frequency magnetic field transmit coils: Ltx1 and Ltx2, and Ltx1 and Ltx2 are respectively connected in series to a capacitor Ctx1 and a capacitor Ctx2 to form a series resonant circuit. A direct current power supply Udc1, a half bridge inverter circuit including switch transistors Q1 and Q2, and a capacitor Ctx1 form a low frequency magnetic field generate circuit of Ltx1. A direct current power supply Udc2, a half bridge inverter circuit including switch transistors Q3 and Q4, and a capacitor Ctx2 form a low frequency magnetic field generate circuit of Ltx2. The low frequency magnetic field generate circuits of Ltx1 and Ltx2 are connected to the low frequency magnetic field transmit-end control module. The low frequency magnetic field transmit-end control module controls connection and disconnection of the switch transistors (Q1 and Q2, or Q3 and Q4) in the half bridge inverter circuit, to convert a direct current into an alternating current with the same frequency as a resonant frequency of the series resonant circuit. The series resonant circuit generates series resonance under a function of the alternating current, so that Ltx1 or Ltx2 generates an alternating magnetic field. In an implementation provided in this application, the low frequency magnetic field transmit-end control module controls the switch transistors in the half bridge inverter circuit, so that Ltx1 and Ltx2 sequentially transmit the alternating magnetic fields as one frame of a low frequency magnetic field signal. Total duration of transmitting magnetic field signals by Ltx1 and Ltx2 is agreed-on duration. In other words, signal lengths of the low frequency magnetic field signals transmitted by Ltx1 and Ltx2 are agreed-on signal lengths. The low frequency magnetic field transmit apparatus may transmit the agreed-on signal lengths to a low frequency magnetic field receive apparatus.

Figure 10:
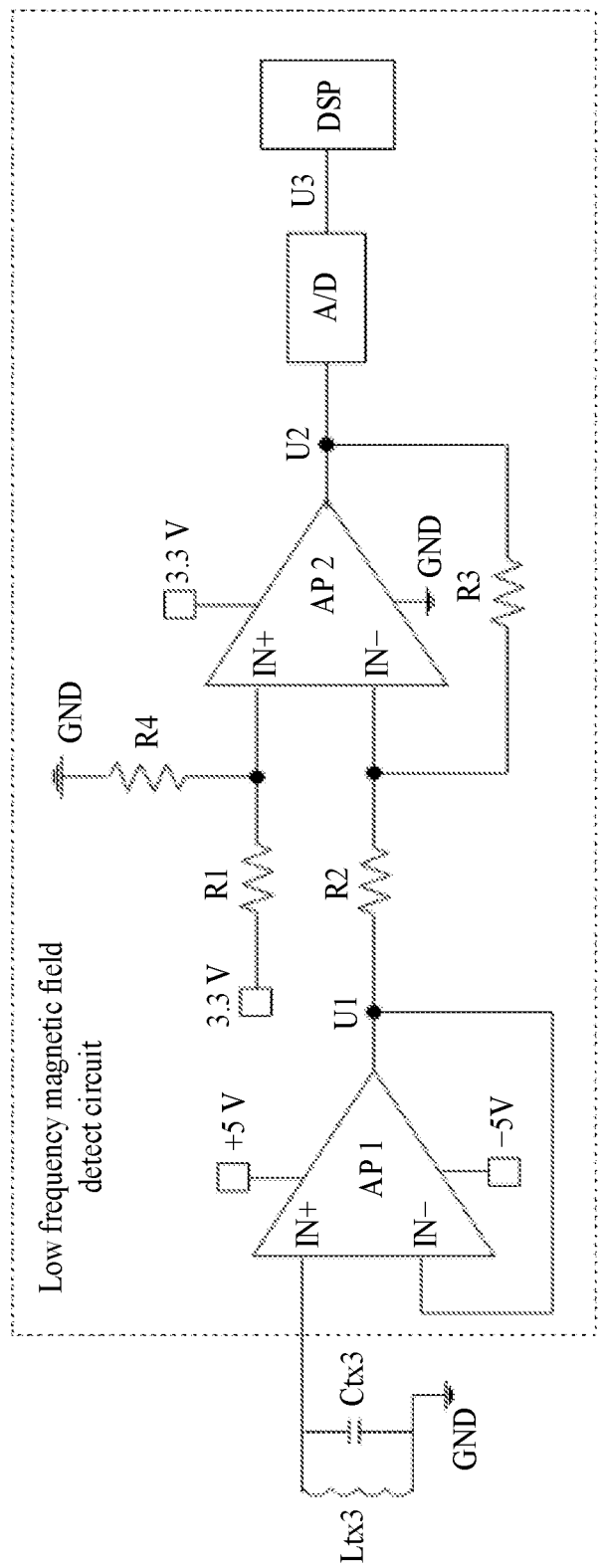
FIG. 10 is a schematic diagram of a circuit of a low frequency magnetic field detect circuit according to this application.

The conflict detect apparatus includes a conflict detect coil (that is, Ltx3) and a magnetic field conflict detect circuit, and is configured to detect whether another parking space transmits a low frequency magnetic field signal. In this application, Ltx3 and Ctx3 form a parallel resonant circuit. The parallel resonant circuit is connected to the low frequency magnetic field detect circuit, to enhance a detection capability of the conflict detect coil for a weak signal. The low frequency magnetic field detect circuit may detect a signal length of a low frequency magnetic field signal sensed by the conflict detect coil (for ease of description, description may be provided by using an example in which the low frequency magnetic field signal sensed by the conflict detect coil is used as a background signal), send the signal length to the low frequency magnetic field transmit-end control module for determining, and determine whether the sensed low frequency magnetic field signal is a low frequency magnetic field signal transmitted by an adjacent parking space. If it is determined that the low frequency magnetic field signal sensed by the conflict detect coil is the low frequency magnetic field signal transmitted by the adjacent parking space, the low frequency magnetic field transmit apparatus may further send the signal length of the background signal to the low frequency magnetic field receive apparatus. An implementation of the low frequency magnetic field detect circuit may be determined according to an actual application scenario. This is not limited herein. The following describes an example of an implementation. FIG. 10 is a schematic diagram of a circuit of a low frequency magnetic field detect circuit according to this application. As shown in FIG. 10, alternating voltages exist at two ends of the parallel resonant network (that is, a parallel resonant network formed by Ltx3 and Ctx3 connected in parallel) and have positive and negative values. An output impedance of the parallel resonant network is amplified to U1 by using a voltage follower circuit of an operational amplifier AP1, and then a direct current bias is added to an output U2 by using an operational amplifier AP2 and resistors R1, R2, and R3, so that an output voltage of the operational amplifier AP2 falls within a voltage range from 0 V to 3.3 V. After the output voltage U2 is input to an analog-to-digital conversion module A/D, a digital variable U3 is obtained, and U3 is input to digital signal processing (digital signal process, DSP) for processing. Herein, the DSP may indicate a low frequency magnetic field transmit-end control module. The DSP performs fast fourier transform (FFT) analysis on U3. When the DSP performs FFT analysis on U3 to determine that a signal amplitude is greater than or equal to a preset signal amplitude threshold, the DSP determines that the parallel resonant circuit senses a low frequency magnetic field signal of another parking space. In other words, it may be considered as that there is the low frequency magnetic field transmit signal of another parking space. In this case, the DSP may further determine duration of a signal based on duration in which the signal amplitude is greater than or equal to the preset signal amplitude threshold, and determine the signal duration as the signal length of the sensed background signal.

In some feasible implementations, four low frequency magnetic field receive coils such as Lrx1, Lrx2, Lrx3, and Lrx4 may be used in the low frequency magnetic field receive apparatus. To increase detectable distances of the low frequency magnetic field receive coils, capacitors: Crx1, Crx2, Crx3, and Crx4 may be respectively connected in parallel to Lrx1, Lrx2, Lrx3, and Lrx4 to obtain the parallel resonant circuits. The parallel resonant circuits are connected to the magnetic field detect circuit, to enhance a detection capability of the low frequency magnetic field receive coil for a weak signal. A parallel resonant circuit including Lrx1 and Crx1 is connected to a magnetic field detect circuit 1. A parallel resonant circuit including Lrx2 and Crx2 is connected to a magnetic field detect circuit 2. A parallel resonant circuit including Lrx3 and Crx3 is connected to a magnetic field detect circuit 3. A parallel resonant circuit including Lrx4 and Crx4 is connected to a magnetic field detect circuit 4. The magnetic field detect circuits (including the magnetic field detect circuit 1, the magnetic field detect circuit 2, the magnetic field detect circuit 3, and the magnetic field detect circuit 4) may detect an amplitude and a time length of a signal sensed by the low frequency magnetic field receive coil, and then send the amplitude and the time length to a low frequency magnetic field receive-end control module. The low frequency magnetic field receive-end control module calculates relative positions of the low frequency magnetic field transmit coil and the low frequency magnetic field receive coil based on the signal amplitude.

It should be noted that the positioning method based on a low frequency magnetic field provided in this application is implemented through cooperation between the low frequency magnetic field transmit apparatus and the low frequency magnetic field receive apparatus. Therefore, a communications module, and a low frequency magnetic field transmit-end communications module and a low frequency magnetic field receive-end communications module shown in FIG. 9 may be separately configured in the low frequency magnetic field transmit apparatus and the low frequency magnetic field receive apparatus. The low frequency magnetic field transmit-end communications module and the low frequency magnetic field receive-end communications module may implement communication by using technologies such as Wi-Fi, Bluetooth, zigbee, and radio frequency identification (RFID). This may be specifically determined according to an actual application scenario. This is not limited herein. In this application, information sent or received by the low frequency magnetic field receive-end communications module in the low frequency magnetic field receive apparatus or the low frequency magnetic field transmit-end communications module in the low frequency magnetic field transmit apparatus is explained by using a communication protocol jointly followed by both parties. Details are not described below.

Figure 11:
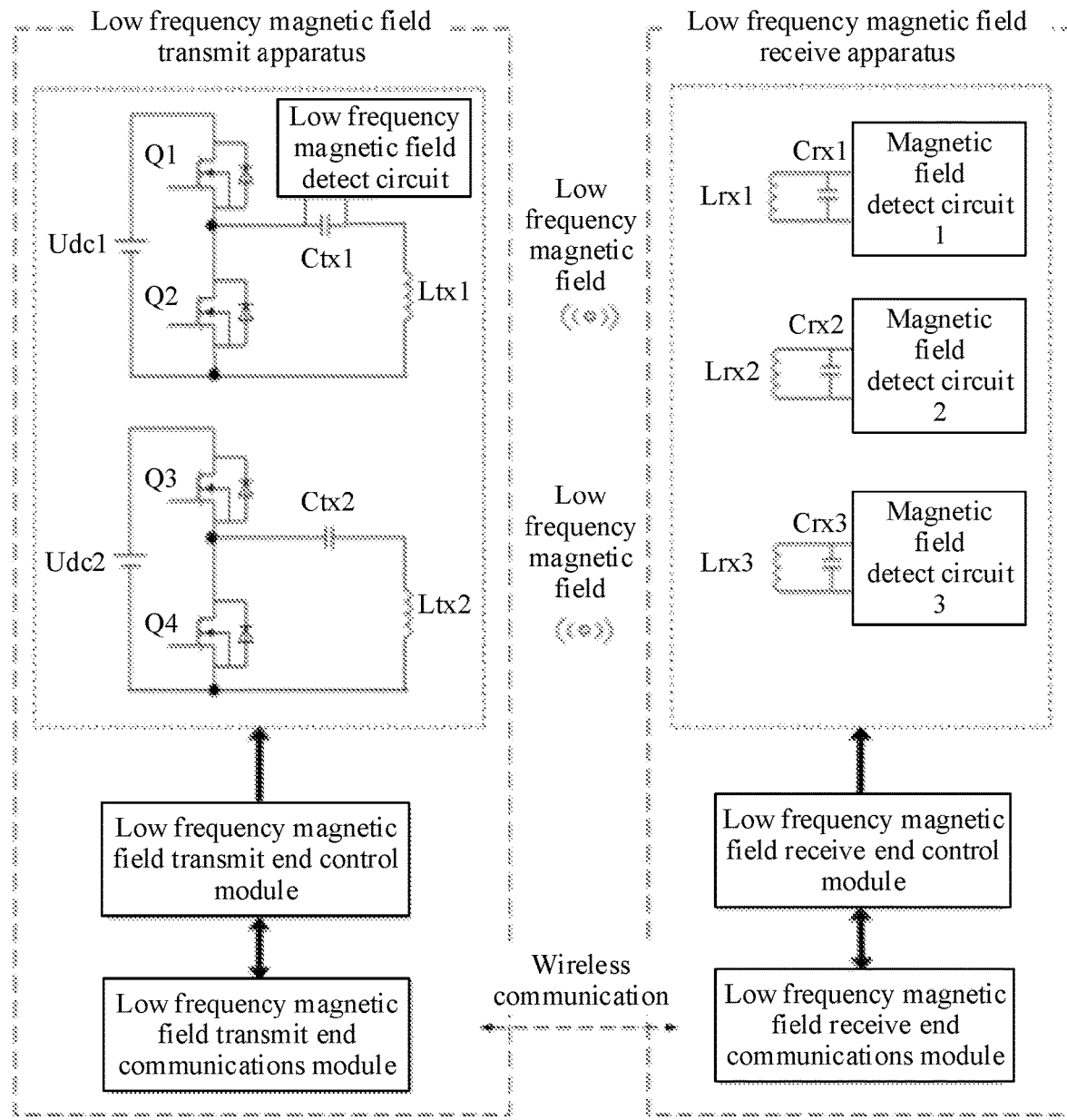
FIG. 11 is a schematic diagram of another hardware structure of a positioning system based on a low frequency magnetic field according to this application.

Hardware structure 2 of a positioning system based on a low frequency magnetic field:

In some feasible implementations, the low frequency magnetic field transmit coil and the conflict detect coil do not simultaneously work. Therefore, the conflict detect coil and the low frequency magnetic field transmit coil of the low frequency magnetic field transmit apparatus can be multiplexed. FIG. 11 is a schematic diagram of another hardware structure of a positioning system based on a low frequency magnetic field according to this application. As shown in FIG. 11, a low frequency magnetic field transmit coil and a conflict detect coil of the low frequency magnetic field transmit apparatus are multiplexed. In other words, in this case, the low frequency magnetic field transmit coil and the conflict detect coil are the same coil in the low frequency magnetic field transmit apparatus, for example, Ltx1. A connection mode of a switch transistor of an inverter circuit may be changed to implement function switching of transmission of a low frequency magnetic field signal and conflict detection of a low frequency magnetic field signal. As shown in FIG. 10, a magnetic field generation detection control module in a low frequency magnetic field transmit apparatus includes a low frequency magnetic field detect circuit, a direct current power supply Udc1, a first switch Q1, a second switch Q2, and a first capacitor Ctx1. Herein, Ltx1 is connected in parallel to Ctx1 to obtain a parallel resonant circuit. The parallel resonant circuit is connected to the low frequency magnetic field detect circuit. Q1 and Q2 are connected in series, and then connected in parallel to two ends of Udc1 to obtain an inverter circuit (for example, an inverter circuit 1). One end of Ctx1 is separately connected to Q1 and Q2, and the other end of Ctx1 is connected in series to Ltx1 to obtain a series resonant circuit. Ctx1 and the inverter circuit 1 form a low frequency magnetic field generate circuit of Ltx1. A low frequency magnetic field transmission control module (that is, a low frequency magnetic field transmit-end control module) is configured to control connection or disconnection of Q1 and Q2, to control Ltx1 to sense a low frequency magnetic field signal, or control Ltx1 to transmit a low frequency magnetic field signal. The low frequency magnetic field receive apparatus may use three low frequency magnetic field receive coils and a magnetic field detect circuit instead. The parallel resonant circuit including Lrx1 and Crx1 is connected to the magnetic field detect circuit 1. The parallel resonant circuit including Lrx2 and Crx2 is connected to the magnetic field detect circuit 2. The parallel resonant circuit including Lrx3 and Crx3 is connected to the magnetic field detect circuit 3.

In some feasible implementations, switch mode switching of the inverter circuit from a low frequency magnetic field transmission mode to a conflict detection mode may be added before conflict detection, and a switch mode switching process of the inverter circuit from the conflict detection mode to the low frequency magnetic field transmission mode may be added after conflict detection. When Ltx1 works in the conflict detection mode, the low frequency magnetic field transmit-end control module controls Q1 to be disconnected and Q2 to be connected. In this case, Ltx1 and Ctx1 form a parallel resonant circuit. A magnetic field strength signal is obtained at Ctx1 by using the low frequency magnetic field detect circuit, to determine whether a low frequency magnetic field channel is occupied by a low frequency magnetic field transmit apparatus of a remaining parking space. When Ltx1 works in the low frequency magnetic field transmission mode, the low frequency magnetic field transmit-end control module controls Q1 and Q2 to be connected in an alternating manner, and Ltx1 and Ctx1 form a series compensation circuit and transmit a magnetic field. The low frequency magnetic field transmit coil and the conflict detect coil are multiplexed, so that one coil can be omitted, to reduce implementation costs of a positioning system based on a low frequency magnetic field and save space of the low frequency magnetic field transmit apparatus, thereby implementing high applicability.

With reference to the application scenario shown in FIG. 8, the following describes a working principle of the positioning system based on a low frequency magnetic field provided in this application shown in FIG. 7.

In some feasible implementations, a wireless charging transmit apparatus of a wireless charging system is disposed at the parking space 2. A power transmit coil is disposed in the wireless charging transmit apparatus. A wireless charging receive apparatus of a wireless charging system is disposed on a vehicle. A power receive coil is disposed in the wireless receive apparatus. In a process of driving the vehicle to the parking space 2, when the vehicle is at a specified distance (for example, two meters) from the power transmit coil at the parking space 2, the low frequency magnetic field receive-end control module requests, by using the low frequency magnetic field receive-end communications module, the low frequency magnetic field transmit-end control module to enable a low frequency magnetic field guiding alignment function (that is, to enable a positioning function based on a low frequency magnetic field). The low frequency magnetic field transmit-end control module makes a response and agrees to enable the positioning function by using the low frequency magnetic field transmit-end communications module, and performs initialization. Optionally, in some feasible implementations, a request for enabling the low frequency magnetic field guiding alignment function may also be sent by the low frequency magnetic field transmit apparatus. This may be specifically determined according to an actual application scenario. This is not limited herein. For example, if the low frequency magnetic field receive apparatus is installed at the vehicle end, the request is preferably sent by the low frequency magnetic field receive apparatus, because guiding alignment is enabled only when the vehicle is close and requires guidance, to implement higher applicability. The low frequency magnetic field receive-end control module sends one piece of information to the low frequency magnetic field transmit-end control module by using the low frequency magnetic field receive-end communications module. According to a communications protocol jointly followed by both parties; the information is interpreted as a request to use the low frequency magnetic field to perform guiding alignment. Similarly, in this application, information sent or received by the low frequency magnetic field receive apparatus or the low frequency magnetic field transmit apparatus is also explained according to the communication protocol jointly followed by both parties. Details are not described below. The low frequency magnetic field transmit-end control module receives, by using the low frequency magnetic field transmit-end communications module, request information that is sent by a low frequency magnetic field receive end for enabling guiding alignment. The low frequency magnetic field transmit-end control module makes a response to the low frequency magnetic field receive-end control module. The response information includes information indicating that the low frequency magnetic field is allowed for guiding alignment, identification information of the low frequency magnetic field transmit coil (for example, Ltx1 and Ltx2), a coil size, relative positions of the low frequency magnetic field transmit coil and the power transmit coil, and the like. The identification information of the low frequency magnetic field transmit coil is used to distinguish between the low frequency magnetic field transmit coils, for example, Ltx1 and Ltx2. The coil size needs to be used when the relative positions of the low frequency magnetic field transmit coil and the low frequency magnetic field receive coil are calculated. Relative positions of the power transmit coil and each of Ltx1 and Ltx2 are used to finally determine relative positions of the power transmit coil and the power receive coil.

In some feasible implementations, after the magnetic field generation detection control module enables the positioning function based on a low frequency magnetic field, the conflict detect coil senses a low frequency magnetic field signal. When the conflict detect coil does not sense a low frequency magnetic field signal, the magnetic field generation detection control module may control the low frequency magnetic field transmit coil to transmit a low frequency magnetic field signal (that is, a first low frequency magnetic field signal). The low frequency magnetic field receive coil receives a low frequency magnetic field signal. When it is determined that the low frequency magnetic field signal received by the low frequency magnetic field receive coil is the first low frequency magnetic field signal transmitted by the low frequency magnetic field transmit coil, the magnetic field detection control module determines relative positions of the low frequency magnetic field transmit coil and the low frequency magnetic field receive coil based on signal strength of the first low frequency magnetic field signal. After determining the relative positions of the low frequency magnetic field transmit coil and the low frequency magnetic field receive coil, the magnetic field detection control module may further determine the relative positions of the power transmit coil and the power receive coil based on the relative positions of the low frequency magnetic field transmit coil and the power transmit coil and the relative positions of the low frequency magnetic field receive coil and the power receive coil, and may further present the relative positions of the power transmit coil and the power receive coil to the driver or the automatic driving system to implement guiding alignment between the power transmit coil and the power receive coil.

In some feasible implementations, before transmitting the low frequency magnetic field signal, the low frequency magnetic field transmit apparatus detects, by using the conflict detect coil, whether there is a low frequency magnetic field signal, to determine whether a low frequency magnetic field channel is occupied by a low frequency magnetic field transmit apparatus at another parking space, and transmits the low frequency magnetic field signal only when the low frequency magnetic field channel is not occupied. In this case, if a plurality of low frequency magnetic field transmit apparatuses detect that the low frequency magnetic field channel is not occupied, the low frequency magnetic field transmit apparatuses simultaneously transmit low frequency magnetic field signals at a large probability, thereby causing a conflict. Therefore, when a positioning function based on a low frequency magnetic field is enabled, the magnetic field generation detection control module of the low frequency magnetic field transmit apparatus may further generate an initial value of a countdown and start the countdown. When it is determined that the conflict detect coil does not sense a low frequency magnetic field signal, and the countdown ends, the magnetic field generation detection control module controls the low frequency magnetic field transmit coil to transmit the first low frequency magnetic field signal. To prevent the plurality of low frequency magnetic field transmit apparatuses from simultaneously transmitting low frequency magnetic field signals, herein, the magnetic field generation detection control module generates the initial value of the countdown when the positioning function is enabled. The initial value may be a random number. Optionally, the initial value may also be an agreed-on count value. For example, the initial value that is of the countdown and that is generated by the low frequency magnetic field transmit apparatus at the parking space is a count value (for example, one initial value randomly selected from a plurality of initial values). Initial values that are of countdowns and that are generated by low frequency magnetic field transmit apparatuses at different parking spaces are different (for example, the initial values corresponding to different parking spaces are different count values randomly selected from the plurality of initial values). The initial value of the countdown may also be determined in other manners. This is not limited herein.

In some feasible implementations, if the magnetic field generation detection control module detects that the conflict detect coil senses a low frequency magnetic field signal (that is, a second low frequency magnetic field signal) transmitted by the low frequency magnetic field transmit apparatus at the adjacent parking space, the magnetic field generation detection control module stops the countdown and detects a signal length of the second low frequency magnetic field signal, and continues the countdown when the detection of the signal length of the second low frequency magnetic field signal is completed. Herein, the detection of the second low frequency magnetic field signal may be implemented by using the low frequency magnetic field detect circuit shown in FIG. 10. Details are not described herein again. After the countdown is continued, when it is detected that the conflict detect coil does not sense another low frequency magnetic field signal, and the countdown ends, the magnetic field generation detection control module controls the low frequency magnetic field transmit coil to transmit the low frequency magnetic field signal. It should be noted that, in the positioning system provided in this application, the signal length of the low frequency magnetic field signal transmitted by the low frequency magnetic field transmit coil may be an agreed-on signal length. If the signal length of the background signal (that is, the second low frequency magnetic field signal) detected by the conflict detect coil is the same as the agreed-on signal length, the agreed-on signal length of the low frequency magnetic field signal transmitted by the low frequency magnetic field transmit coil is adjusted, so that the signal length (that is, the first signal length) of the low frequency magnetic field signal (that is, the first low frequency magnetic field signal) transmitted by the low frequency magnetic field transmit coil is different from the signal length (that is, a second signal length) of the second low frequency magnetic field signal. Herein, the second low frequency magnetic field signal represents a background signal detected by the conflict detect coil, and the second signal length represents a signal length of the background signal. It may be understood that if the conflict detect coil detects a plurality of background signals, there are a plurality of second low frequency magnetic field signals in this case, and the plurality of second low frequency magnetic field signals have a plurality of signal lengths (that is, the plurality of second signal lengths are different). In this case, the signal length of the low frequency magnetic field signal transmitted by the low frequency magnetic field transmit coil is different from the signal lengths of the second low frequency magnetic field signals.

In some feasible implementations, the low frequency magnetic field transmit apparatus may send the first signal length to the magnetic field detection control module (specifically, the low frequency magnetic field receive-end communications module in the magnetic field detection control module) of the low frequency magnetic field receive apparatus by using the low frequency magnetic field transmit-end communications module. When it is detected that the signal length of the low frequency magnetic field signal received by the low frequency magnetic field receive coil is the same as the first signal length, the magnetic field detection control module determines that the low frequency magnetic field signal received by the low frequency magnetic field receive coil is the first low frequency magnetic field signal, and may further determine the relative positions of the low frequency magnetic field transmit coil and the low frequency magnetic field receive coil based on the signal strength of the first low frequency magnetic field signal. Herein, the low frequency magnetic field transmit apparatus end has at least one low frequency magnetic field transmit coil, and the low frequency magnetic field receive apparatus end has at least three low frequency magnetic field receive coils. A reference point is a baseline point (0,0) (it is assumed that a middle point of the power transmit coil is the baseline point). Each receive coil has coordinates: (X, Y) relative to the transmit coil. The low frequency magnetic field transmit coil has a relative position relative to the power transmit coil. The three low frequency magnetic field receive coils have relative positions relative to the power receive coil. The relative positions of the power receive coil and the power transmit coil may be obtained based on relative positions of each of the three low frequency magnetic field receive coils and the low frequency magnetic field transmit coil, a position relationship between the low frequency magnetic field transmit coil and the power transmit coil, and a position relationship between the low frequency magnetic field receive coil and the power receive coil.

Figure 12:
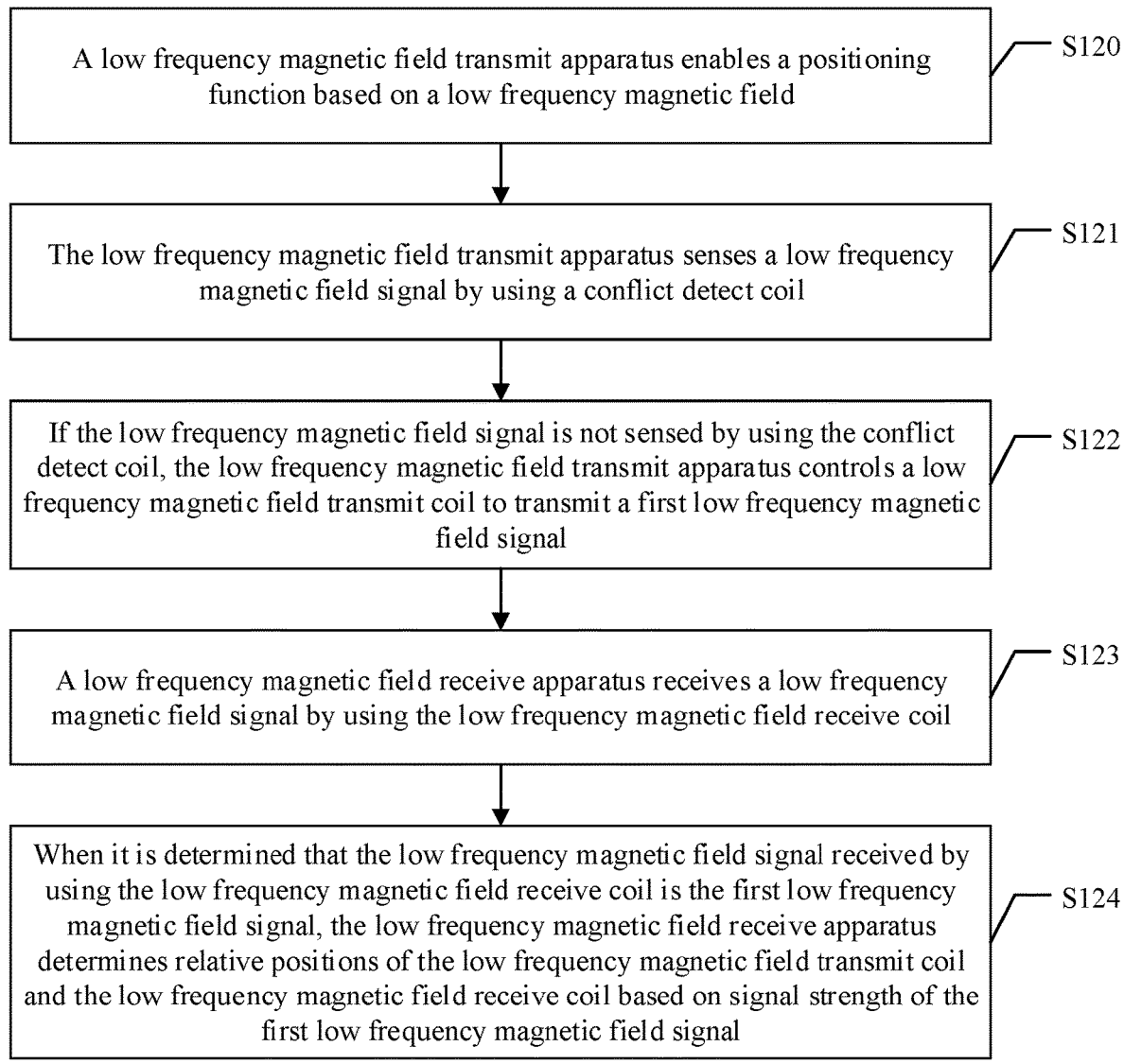
FIG. 12 is a schematic flowchart of a positioning method based on a low frequency magnetic field according to this application.

FIG. 12 is a schematic flowchart of a positioning method based on a low frequency magnetic field according to this application. The positioning method based on a low frequency magnetic field provided in this application is applicable to the foregoing positioning system based on a low frequency magnetic field (as shown in FIG. 7). For ease of description, the following is described by using the low frequency magnetic field transmit apparatus and the low frequency magnetic field receive apparatus in the positioning system based on a low frequency magnetic field as execution entities. As shown in FIG. 12, the positioning method based on a low frequency magnetic field provided in this application may include the following steps:

S120: The low frequency magnetic field transmit apparatus enables a positioning function based on a low frequency magnetic field.

In some feasible implementations, in a process of driving a vehicle to a parking space, when the vehicle is at a specified distance from a power transmit coil at the parking space, the low frequency magnetic field receive apparatus may request the low frequency magnetic field transmit apparatus to enable a low frequency magnetic field guiding alignment function (that is, enable a positioning function based on a low frequency magnetic field). The low frequency magnetic field transmit apparatus makes a response and agrees to enable the positioning function, and performs initialization.

S121: The low frequency magnetic field transmit apparatus senses a low frequency magnetic field signal by using a conflict detect coil.

S122: If the low frequency magnetic field signal is not sensed by using the conflict detect coil, the low frequency magnetic field transmit apparatus controls a low frequency magnetic field transmit coil to transmit a first low frequency magnetic field signal.

In some feasible implementations, after enabling the positioning function based on a low frequency magnetic field, the low frequency magnetic field transmit apparatus can sense the low frequency magnetic field signal by using the conflict detect coil. When the low frequency magnetic field signal is not sensed by using the conflict detect coil, the low frequency magnetic field transmit apparatus may control the low frequency magnetic field transmit coil to transmit the low frequency magnetic field signal (that is, the first low frequency magnetic field signal). Herein, the first low frequency magnetic field signal is used to determine relative positions of the low frequency magnetic field transmit coil and a low frequency magnetic field receive coil.

S123: The low frequency magnetic field receive apparatus receives the low frequency magnetic field signal by using the low frequency magnetic field receive coil.

S124: When it is determined that the low frequency magnetic field signal received by using the low frequency magnetic field receive coil is the first low frequency magnetic field signal, the low frequency magnetic field receive apparatus determines the relative positions of the low frequency magnetic field transmit coil and the low frequency magnetic field receive coil based on signal strength of the first low frequency magnetic field signal.

In some feasible implementations, the low frequency magnetic field receive apparatus may receive the low frequency magnetic field signal by using the low frequency magnetic field receive coil. When it is determined that the low frequency magnetic field signal received by using the low frequency magnetic field receive coil is the first low frequency magnetic field signal transmitted by the low frequency magnetic field transmit coil, the low frequency magnetic field receive apparatus determines the relative positions of the low frequency magnetic field transmit coil and the low frequency magnetic field receive coil based on the signal strength of the first low frequency magnetic field signal. After determining the relative positions of the low frequency magnetic field transmit coil and the low frequency magnetic field receive coil, the low frequency magnetic field receive apparatus may further determine relative positions of a power transmit coil and a power receive coil based on the relative positions of the low frequency magnetic field transmit coil and the power transmit coil and the relative positions of the low frequency magnetic field receive coil and the power receive coil, and may further present the relative positions of the power transmit coil and the power receive coil to the driver or an automatic driving system to implement guiding alignment between the power transmit coil and the power receive coil.

In the positioning method provided in this application, the following case can be avoided: a low frequency magnetic field receive apparatus on the vehicle senses a low frequency magnetic field signal transmitted by a low frequency magnetic field transmit apparatus at an adjacent parking space, to reduce mutual interference when the low frequency magnetic field receive apparatus receives low frequency magnetic field signals in a positioning process of the power receive coil and the power transmit coil at the adjacent parking space. This improves positioning accuracy of the power transmit coil and the power receive coil in the wireless charging system. Charging efficiency of the wireless charging system can be improved, to implement higher applicability.

Figure 13:
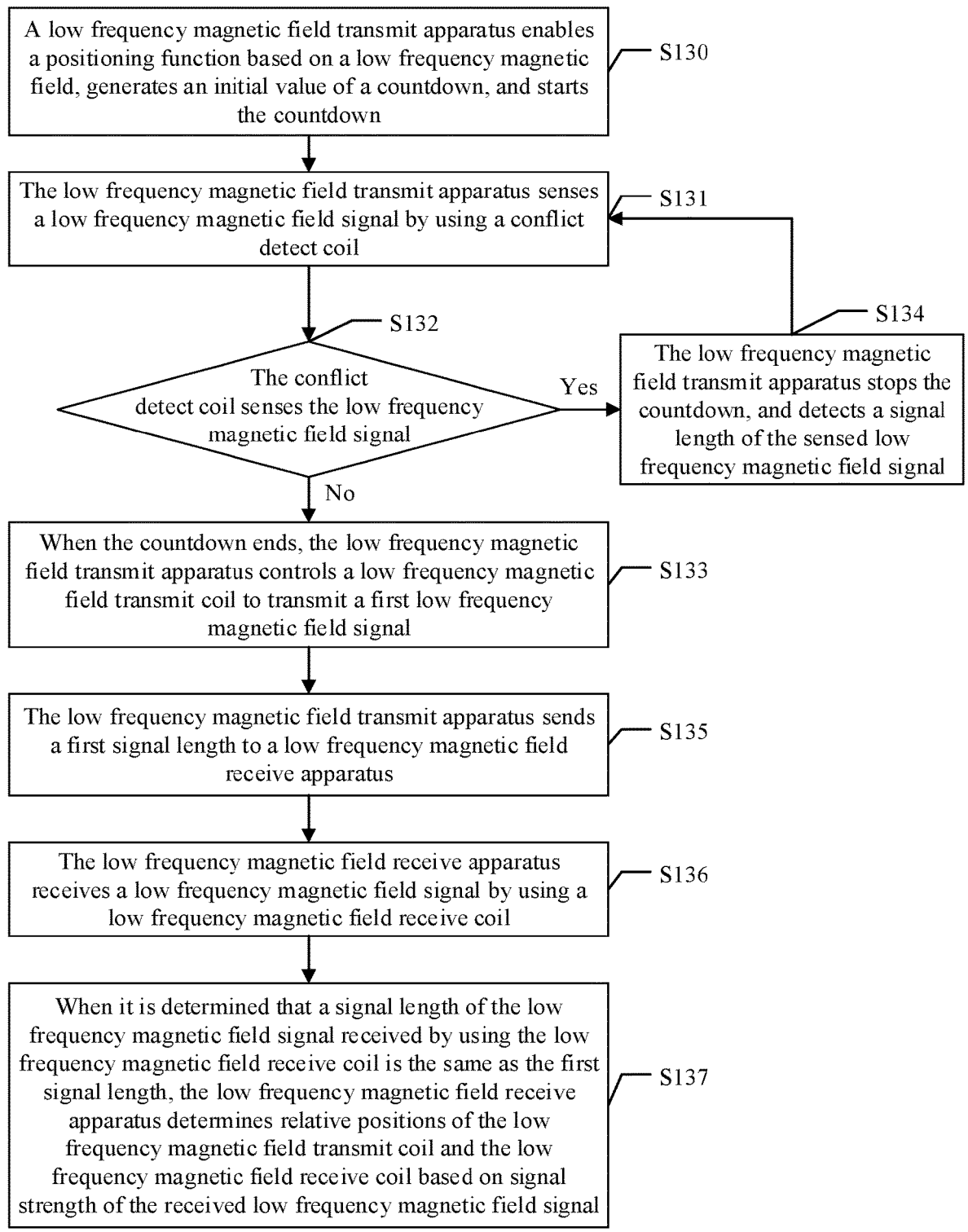
FIG. 13 is another schematic flowchart of a positioning method based on a low frequency magnetic field according to this application.

In some feasible implementations, FIG. 13 is another schematic flowchart of a positioning method based on a low frequency magnetic field according to this application. This application provides a positioning method based on timer contention. A random number is introduced to reduce a conflict occurrence probability, to improve positioning accuracy of a low frequency magnetic field transmit coil and a low frequency magnetic field receive coil, thereby implementing higher applicability. The positioning method based on a low frequency magnetic field provided in this application may include the following steps:

S130: A low frequency magnetic field transmit apparatus enables a positioning function based on a low frequency magnetic field, generates an initial value of a countdown, and starts the countdown.

S131: The low frequency magnetic field transmit apparatus senses a low frequency magnetic field signal by using a conflict detect coil.

In some feasible implementations, in a process of driving a vehicle to a parking space, when the vehicle is at a specified distance from a power transmit coil at a parking space, a low frequency magnetic field receive apparatus may request the low frequency magnetic field transmit apparatus to enable a low frequency magnetic field guiding alignment function (that is, enable a positioning function based on a low frequency magnetic field). The low frequency magnetic field transmit apparatus makes a response and agrees to enable the positioning function, and performs initialization. Herein, the low frequency magnetic field transmit apparatus receives request information that is sent by the low frequency magnetic field receive apparatus for enabling guiding alignment. The low frequency magnetic field transmit apparatus makes a response to the low frequency magnetic field receive apparatus. The response information includes information indicating that the low frequency magnetic field is allowed for guiding alignment (that is, a positioning function based on a low frequency magnetic field is allowed to be enabled), identification information of the low frequency magnetic field transmit coil (for example, Ltx1 and Ltx2), a coil size, relative positions of the low frequency magnetic field transmit coil and the power transmit coil, and the like. The identification information of the low frequency magnetic field transmit coil is used to distinguish between the low frequency magnetic field transmit coils, for example, Ltx1 and Ltx2. The coil size is used when relative positions of the low frequency magnetic field transmit coil and the low frequency magnetic field receive coil are calculated. Relative positions of the power transmit coil and each of Ltx1 and Ltx2 are used to finally determine relative positions of the power transmit coil and the power receive coil. When the positioning function based on a low frequency magnetic field is enabled, the low frequency magnetic field transmit apparatus may generate a random number $t_0$. At the same time, a timer starts a countdown, and an initial value of the countdown is $t_0$.

S132: Determine whether the conflict detect coil senses a low frequency magnetic field signal. If a determining result is that the conflict detect coil does not sense the low frequency magnetic field signal, perform step S133. If a determining result is that the conflict detect coil senses the low frequency magnetic field signal, perform step S134.

S133: When the countdown ends, the low frequency magnetic field transmit apparatus controls the low frequency magnetic field transmit coil to transmit a first low frequency magnetic field signal.

S134: The low frequency magnetic field transmit apparatus stops the countdown, and detects a signal length of the sensed low frequency magnetic field signal.

In some feasible implementations, the low frequency magnetic field transmit apparatus may detect, by using the conflict detect coil (for example, Ltx3), whether a low frequency magnetic field transmit apparatus at another parking space is transmitting a low frequency magnetic field signal. If the low frequency magnetic field signal is not sensed by using the conflict detect coil and the countdown ends, the low frequency magnetic field transmit apparatus controls the low frequency magnetic field transmit coil to transmit the first low frequency magnetic field signal. If the low frequency magnetic field signal is sensed by using the conflict detect coil, the low frequency magnetic field transmit apparatus stops the countdown, and detects a signal length of the sensed low frequency magnetic field signal. If the low frequency magnetic field transmit apparatus does not detect a low frequency magnetic field signal transmitted by a low frequency magnetic field apparatus at another parking space after completing detection of the signal length of the low frequency magnetic field signal, the low frequency magnetic field transmit apparatus continues the countdown.

In some feasible implementations, the low frequency magnetic field transmit apparatus (for example, a low frequency magnetic field transmit apparatus at a parking space 2) in this positioning system may transmit a frame of a low frequency magnetic field; and may transmit, by using the low frequency magnetic field transmit coil (for example, Ltx1 and Ltx2), a low frequency magnetic field signal with a preset controllable feature (for example, 4 ms) whose signal length is different from a signal length of a sensed background signal (for example, a second low frequency magnetic field signal). A low frequency magnetic field transmit-end control module in the low frequency magnetic field transmit apparatus may transmit control signals to two half-bridge inverter circuits in a hardware structure shown in FIG. 9 or FIG. 11, and separately control a connection status of Q1, Q2, Q3, and Q4. Low frequency magnetic field transmit coils: Ltx1 and Ltx2 transmit low frequency magnetic field signals in a time division manner. To be specific, when Ltx1 transmits signals, Ltx2 does not transmit signals, and this process is stopped after 2 ms; then, when Ltx2 transmits signals, Ltx1 does not transmit signals, and this process is stopped after 2 ms. After transmitting the low frequency magnetic field signal, the low frequency magnetic field transmit apparatus generates a random number again, and repeats the foregoing procedure.

S135: The low frequency magnetic field transmit apparatus sends a first signal length to the low frequency magnetic field receive apparatus.

S136: The low frequency magnetic field receive apparatus receives a low frequency magnetic field signal by using the low frequency magnetic field receive coil.

S137: When it is determined that a signal length of the low frequency magnetic field signal received by using the low frequency magnetic field receive coil is the same as the first signal length, the low frequency magnetic field receive apparatus determines the relative positions of the low frequency magnetic field transmit coil and the low frequency magnetic field receive coil based on signal strength of the received low frequency magnetic field signal.

In some feasible implementations, the low frequency magnetic field transmit apparatus may further send the signal length of the first low frequency magnetic field signal (that is, the first signal length, for example, 4 ms) as an agreed-on feature to the low frequency magnetic field receive apparatus, and the low frequency magnetic field receive apparatus may receive the first signal length from the low frequency magnetic field transmit apparatus. After receiving information about the signal lengths (for example, 4 ms) of the low frequency magnetic field signals transmitted by the low frequency magnetic field transmit coils: Ltx1 and Ltx2, the low frequency magnetic field receive apparatus learns of signal length features of the low frequency magnetic field signals transmitted by the low frequency magnetic field transmit coils of the low frequency magnetic field transmit apparatus in this positioning system. In this case, the low frequency magnetic field receive apparatus obtains signal strength of low frequency magnetic field signals received by low frequency magnetic field receive coils: Lrx1, Lrx2, Lrx3, and Lrx4; and if the signal length of the low frequency magnetic field signal received by the low frequency magnetic field receive coil is not the agreed-on signal length (that is, 4 ms), does not process data of the signal strength of the low frequency magnetic field signal. If the signal length of the low frequency magnetic field signal received by the low frequency magnetic field receive coil is the agreed-on signal length (that is, 4 ms), it may be determined that the low frequency magnetic field signal is a low frequency magnetic field signal (that is, the first low frequency magnetic field signal) transmitted by the low frequency magnetic field transmit apparatus at the parking space 2. The low frequency magnetic field receive apparatus may detect signal strength in first 2 ms of the low frequency magnetic field signal and signal strength in later 2 ms of the low frequency magnetic field signal, to determine the signal strength of the low frequency magnetic field signals transmitted by Ltx1 and Ltx2.

In some feasible implementations, the low frequency magnetic field receive apparatus may calculate relative positions of each of Ltx1 and Ltx2 and each of Lrx1, Lrx2, Lrx3, and Lrx4 based on the signal strength of the low frequency magnetic field signals received by Ltx1 and Ltx2 and sizes of Ltx1 and Ltx2. Further, the relative positions of the power transmit coil and the receive coil may be calculated based on relative positions of each of Ltx1 and Ltx2 and a power transmit coil of a wireless charging transmit apparatus, and relative positions of each of Lrx1, Lrx2, Lrx3, and Lrx4 and a power receive coil of a wireless charging receive apparatus. After determining the relative positions of the low frequency magnetic field transmit coil and the low frequency magnetic field receive coil, the low frequency magnetic field receive apparatus may further determine the relative positions of the power transmit coil and the power receive coil based on the relative positions of the low frequency magnetic field transmit coil and the power transmit coil and relative positions of the low frequency magnetic field receive coil and the power receive coil. This implementation may be determined according to an actual application scenario. This is not limited herein.

In the positioning method provided in this application, the following case can be avoided: the low frequency magnetic field receive apparatus in the vehicle senses a low frequency magnetic field signal transmitted by a low frequency magnetic field transmit apparatus at an adjacent parking space, to reduce mutual positioning interference between the power transmit coil at the adjacent parking space and the power receive coil. This improves positioning accuracy of the power transmit coil and the power receive coil in the wireless charging system. Charging efficiency of the wireless charging system can be improved, to implement higher applicability.

What is claimed is:

1. A positioning system based on a magnetic field, wherein the positioning system comprises a magnetic field transmit apparatus and a magnetic field receive apparatus, wherein the magnetic field transmit apparatus comprises a magnetic field transmit coil, a sensing coil, and a magnetic field generation detection control circuit, wherein the magnetic field receive apparatus comprises a magnetic field receive coil, and a magnetic field detection control circuit, and wherein:
   the sensing coil is configured to sense a magnetic field signal;
   the magnetic field generation detection control circuit is configured to:
      in response to a determination that a positioning function based on the magnetic field is enabled, generate an initial value of a countdown and start the countdown; and
      in response to a determination that the sensing coil does not sense the magnetic field signal and that the countdown ends, control the magnetic field transmit coil to transmit a first magnetic field signal;
   the magnetic field receive coil is configured to receive a magnetic field signal; and
   the magnetic field detection control circuit is configured to: in response to determining that the magnetic field signal received by the magnetic field receive coil is the first magnetic field signal, determine relative positions of the magnetic field transmit coil and the magnetic field receive coil based on signal strength of the first magnetic field signal.

2. The positioning system according to claim 1, wherein the magnetic field generation detection control circuit is further configured to:
   in response to a determination that the sensing coil senses a second magnetic field signal:
   stop the countdown and detect a signal length of the second magnetic field signal; and
   resume the countdown in response to a determination that detection of the signal length of the second magnetic field signal is completed.

3. The positioning system according to claim 1, wherein the initial value of the countdown is a random number.

4. The positioning system according to claim 2, wherein a first signal length of the first magnetic field signal is different from a second signal length of the second magnetic field signal.

5. The positioning system according to claim 4, wherein:
   the magnetic field generation detection control circuit is further configured to send the first signal length to the magnetic field detection control circuit; and
   the magnetic field detection control circuit is configured to: in response to detecting that a signal length of the magnetic field signal received by the magnetic field receive coil is the same as the first signal length, determine that the magnetic field signal received by the magnetic field receive coil is the first magnetic field signal.

6. The positioning system according to claim 1, wherein:
   the magnetic field generation detection control circuit comprises a magnetic field detect circuit and a first capacitor;
   the sensing coil and the first capacitor are connected in parallel to form a parallel resonant circuit; and
   the parallel resonant circuit is connected to the magnetic field detect circuit.

7. The positioning system according to claim 1, wherein:
   the magnetic field transmit coil and the sensing coil are the same coil, and the magnetic field generation detection control circuit comprises a magnetic field transmission control circuit, a magnetic field detect circuit, a direct current power supply, a first switch, a second switch, and a first capacitor;
   the coil and the first capacitor are connected in parallel to form a parallel resonant circuit, wherein the parallel resonant circuit is connected to the magnetic field detect circuit;
   the first switch and the second switch are connected in series, the first switch and the second switch that are connected in series are further connected in parallel to two ends of the direct current power supply to form an inverter circuit, one end of the first capacitor is separately connected to the first switch and the second switch, another end of the first capacitor is connected in series to the coil to form a series resonant circuit, and the first capacitor and the inverter circuit form a magnetic field generate circuit of the coil; and
   the magnetic field transmission control circuit is configured to control connection or disconnection of the first switch and the second switch to control the coil to sense the magnetic field signal or control the coil to transmit the first magnetic field signal.

8. A positioning method based on a magnetic field, the positioning method is applicable to a positioning system based on the magnetic field, the positioning system comprises a magnetic field transmit apparatus and a magnetic field receive apparatus, and the positioning method comprises:

sensing, by the magnetic field transmit apparatus, a magnetic field signal by using a sensing coil;

enabling, by the magnetic field transmit apparatus, a positioning function based on a magnetic field;

generating, by the magnetic field transmit apparatus, an initial value of a countdown;

starting, by the magnetic field transmit apparatus, the countdown;

in response to a determination that the magnetic field signal is not sensed by using the sensing coil and that the countdown ends, controlling, by the magnetic field transmit apparatus, a magnetic field transmit coil to transmit a first magnetic field signal;

receiving, by the magnetic field receive apparatus, a magnetic field signal by using a magnetic field receive coil; and in response to determining that the magnetic field signal received by using the magnetic field receive coil is the first magnetic field signal, determining, by the magnetic field receive apparatus, relative positions of the magnetic field transmit coil and the magnetic field receive coil based on signal strength of the first magnetic field signal.

9. The positioning method according to claim 8, wherein the positioning method further comprises:
in response to a determination that the magnetic field signal is sensed by using the sensing coil:
stopping, by the magnetic field transmit apparatus, the countdown;
detecting, by the magnetic field transmit apparatus, a signal length of the sensed magnetic field signal; and
resuming, by the magnetic field transmit apparatus, the countdown in response to a determination that the detection of the signal length of the sensed magnetic field signal is completed.

10. The positioning method according to claim 8, wherein the initial value of the countdown is a random number.

11. The positioning method according to claim 8, wherein:
a first signal length of the first magnetic field signal is different from a second signal length of the sensed magnetic field signal; and
the positioning method further comprises:
sending, by the magnetic field transmit apparatus, the first signal length to the magnetic field receive apparatus;
receiving, by the magnetic field receive apparatus, the first signal length from the magnetic field transmit apparatus; and in response to a determination that a signal length of the magnetic field signal received by using the magnetic field receive coil is the same as the first signal length, determining that the magnetic field receive coil receives the first magnetic field signal.

12. A positioning method based on a magnetic field, wherein the positioning method is applicable to a magnetic field transmit apparatus in a positioning system, and the positioning method comprises:
sensing, by the magnetic field transmit apparatus, a magnetic field signal by using a sensing coil;
enabling, by the magnetic field transmit apparatus, a positioning function based on a magnetic field;
generating, by the magnetic field transmit apparatus, an initial value of a countdown;
starting, by the magnetic field transmit apparatus, the countdown; and
in response to a determination that the magnetic field signal is not sensed by using the sensing coil and that the countdown ends, controlling, by the magnetic field transmit apparatus, the magnetic field transmit coil to transmit a first magnetic field signal for determining relative positions of the magnetic field transmit coil and magnetic field receive coil.

13. The positioning method according to claim 12, wherein the positioning method further comprises:
in response to a determination that the magnetic field signal is sensed by using the sensing coil:
stopping, by the magnetic field transmit apparatus, the countdown;
detecting, by the magnetic field transmit apparatus, a signal length of the sensed magnetic field signal; and
resuming, by the magnetic field transmit apparatus, the countdown in response to a determination that the detection of the signal length of the sensed magnetic field signal is completed.

14. The positioning method according to claim 12, wherein the initial value of the countdown is a random number.

15. The positioning method according to claim 12, wherein:
a first signal length of the first magnetic field signal is different from a second signal length of the sensed magnetic field signal; and
the positioning method further comprises:
sending, by the magnetic field transmit apparatus, the first signal length to the magnetic field receive apparatus.

* * * * *